US010224792B2

(12) United States Patent
Bernot et al.

(10) Patent No.: US 10,224,792 B2
(45) Date of Patent: Mar. 5, 2019

(54) ROTARY ELECTRICAL MACHINE WITH HOMOPOLAR STRUCTURE

(71) Applicant: FRANCECOL TECHNOLOGY, Saint-Cyr-sur-Loire (FR)

(72) Inventors: Francois Bernot, Luynes (FR); Romain Medarian, Tours Nord (FR); Jonh Morales Morales, Tours (FR); Rodret Mbikou Moutsinga, Tours (FR); Victor Bernaola Mendoza, Tours (FR)

(73) Assignee: FRANCECOL TECHNOLOGY, Saint-Cyr-sur-Loire (FR)

( * ) Notice: Subject to any disclaimer, the term of this patent is extended or adjusted under 35 U.S.C. 154(b) by 224 days.

(21) Appl. No.: 15/500,012

(22) PCT Filed: Jul. 31, 2015

(86) PCT No.: PCT/FR2015/052130
§ 371 (c)(1),
(2) Date: Jan. 27, 2017

(87) PCT Pub. No.: WO2016/016591
PCT Pub. Date: Feb. 4, 2016

(65) Prior Publication Data
US 2017/0264176 A1    Sep. 14, 2017

(30) Foreign Application Priority Data

Jul. 31, 2014 (FR) ..................................... 14 57439

(51) Int. Cl.
*H02K 37/00* (2006.01)
*H02K 19/20* (2006.01)
(Continued)

(52) U.S. Cl.
CPC ............. *H02K 19/20* (2013.01); *H02K 1/145* (2013.01); *H02K 1/246* (2013.01); *H02K 3/28* (2013.01);
(Continued)

(58) Field of Classification Search
CPC ........ H02K 19/20; H02K 1/145; H02K 1/246; H02K 3/28; H02K 16/04; H02K 17/02;
(Continued)

(56) References Cited

U.S. PATENT DOCUMENTS 2,043,052 A * 6/1936 March .................... H02K 19/20
  310/169
3,663,846 A   5/1972 Wagner et al.
(Continued)

FOREIGN PATENT DOCUMENTS

DE    199 56 367 A1    7/2001
FR    2 809 240 A1    11/2001
(Continued)

*Primary Examiner* — Thanh Lam
(74) *Attorney, Agent, or Firm* — Craft Chu PLLC; Andrew W. Chu

(57) ABSTRACT

The rotary electrical machine having a homopolar structure includes a number Npe of electrical phases. The machine includes a juxtaposition, along the rotational axis of the rotary electrical machine, of at least one pair of armatures having a number of poles Np, placed on both sides of at least one inductive coil wound around the rotational axis, two adjacent armatures being angularly offset by any electrical angle θs, preferably between 0° and 180°/Npe, and at least one "passive" inductor of ferromagnetic material, separated from the armatures by an air gap. Either the armatures form the rotor, or the inductor and the other element form the stator.

36 Claims, 30 Drawing Sheets

(51) Int. Cl.
  *H02K 19/18* (2006.01)
  *H02K 19/22* (2006.01)
  *H02K 21/14* (2006.01)
  *H02K 21/22* (2006.01)
  *H02K 1/14* (2006.01)
  *H02K 3/28* (2006.01)
  *H02K 19/10* (2006.01)
  *H02K 1/24* (2006.01)
  *H02K 16/04* (2006.01)
  *H02K 17/02* (2006.01)

(52) U.S. Cl.
  CPC ............. *H02K 16/04* (2013.01); *H02K 17/02* (2013.01); *H02K 19/103* (2013.01); *H02K 19/18* (2013.01); *H02K 19/22* (2013.01); *H02K 21/14* (2013.01); *H02K 21/145* (2013.01); *H02K 21/227* (2013.01); *H02K 2201/03* (2013.01); *H02K 2201/12* (2013.01); *H02K 2213/03* (2013.01)

(58) Field of Classification Search
  CPC ...... H02K 19/103; H02K 19/18; H02K 19/22; H02K 21/227; H02K 2201/03; H02K 2201/12
  USPC .............................. 310/44, 46, 166, 168, 178
  See application file for complete search history.

(56) References Cited

U.S. PATENT DOCUMENTS

| | | | |
|---|---|---|---|
| 5,677,580 | A | 10/1997 | Huang |
| 5,798,594 | A * | 8/1998 | Radovsky ............... H02K 1/08 310/112 |
| 2008/0174195 | A1* | 7/2008 | Tupper .................. H02K 19/20 310/179 |
| 2008/0179982 | A1* | 7/2008 | Kramer ................. H02K 1/145 310/168 |
| 2011/0089774 | A1 | 4/2011 | Kramer |
| 2013/0099619 | A1* | 4/2013 | Bernot .................. H02K 1/145 310/178 |
| 2014/0084716 | A1* | 3/2014 | Bernot .................. H02K 19/06 310/46 |

FOREIGN PATENT DOCUMENTS

| | | |
|---|---|---|
| FR | 2 828 027 A1 | 1/2003 |
| FR | 2 969 409 A1 | 6/2012 |
| WO | 02 091547 A1 | 11/2002 |
| WO | 03 030333 A2 | 4/2003 |
| WO | 2007000054 A1 | 1/2007 |
| WO | 2007043161 A1 | 4/2007 |

* cited by examiner

Inductor with straight edges

Inductor with inclined edges parallel to the following edge

Inductor with stair stepped and radial edges

Inductor with stair stepped edges having a rounding with a 1 mm radius

Inductor with stair stepped edges having a non-circular rounding

Inductor with inclined edges parallel to the following edge with an inward hollow Inductor with inclined edges parallel to the following edge with inner slots Inductor with inclined edges having an inward hollow Inductor with inclined edges parallel to the following edge a height of 15 mm

ROTARY ELECTRICAL MACHINE WITH HOMOPOLAR STRUCTURE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to rotary electric machines, with homopolar structure, also called transverse flux electric machines, composite or the like, very generally including a stator and rotor, and in particular able to be housed in a carcass. The at least one stator and rotor is made up of at least one electric coil supported by a magnetic cylinder head, including at least two poles angularly offset by a substantially equal angle value.

2. Description of Related Art Including Information Disclosed Under 37 CFR 1.97 and 37 CFR 1.98.

Simple homopolar stator machines supplied with alternating current are known from the state of the art. The structure and operation of such an electric machine, also called transverse flux electric machine, are widely described in the literature. They are all based on structures where the electric coils have an annular shape. Said annular arrangement is interesting from a manufacturing perspective, but detrimental to performance, since it generates a very significant leakage flux, and therefore limits the performance at high speeds, due to the inductive nature of the machine.

FIG. 1 shows the prior art for said simple homopolar structure, in an octopolar version, with a three-phase claw stator and rotor with surface magnets. Another embodiment may include a rotor with buried magnets. Another embodiment may include a polyphase stator, there being any number of structural phases (greater than or equal to the unit). Another embodiment may include an inverted external rotor.

The embodiment of FIG. 1 includes three identical stators ($c_1$), ($c_2$) and ($c_3$) forming a three-phase simple homopolar machine ($c_0$). Said stators ($c_1$), ($c_2$) and ($c_3$) will be referred to as structural phases in this document when they are complete with their coil ($c_4$), ($c_5$) or ($c_6$). These structural phases are phase-shifted relative to one another by a mechanical angle of about 30° for a three-phase version. In the case of the embodiment shown in FIG. 1, the angle ($c_{10}$), phase shift angle between phase ($c_1$) and phase ($c_2$), is substantially equal to 30°, and the angle ($c_{11}$), phase shift angle between structural phase ($c_1$) and structural phase ($c_3$), is substantially equal to 60°. The angle ($c_{10}$) substantially corresponds to one third of the electrical angle of the rotary machine, said electrical angle being equal to 360° (one revolution) divided by the number of pairs of poles (four in this octopolar case). The angle ($c_{11}$) is substantially equal to twice the angle ($c_{10}$).

These angular phase shifts may be different, based on the applications, but these variations belong to the known state of the art, applied to other rotary machine structures in particular. They are used only to optimize the final rotary machine. A two-phase version of said rotary machine would include only two stators ($c_1$) and ($c_2$), which would then be offset by an angle ($c_{10}$) equal to 45° in the octopolar embodiment described in FIG. 1. The rules for calculating the angular phase offsets between structural phases, or respective stators, are part of the state of the art. In a poly-phase version, in general, the number of power supply phases is at least equal to the number of structural phases (stators) ($c_1$), ($c_2$), ($c_3$).

In the embodiment of FIG. 1, the stators ($c_1$), ($c_2$) and ($c_3$) can have a claw or undulating structure (made with twisted sheet metal), which is characterized by a visible undulation of the stator coils, respectively denoted ($c_4$), ($c_5$) and ($c_6$) around rotation planes X/Y ($c_{12}$) of each stator. Said undulation can be obtained by twisting stator teeth, as proposed by French patent application no. 2,809,240, or by encircling coils ($c_4$), ($c_5$) and ($c_6$) as proposed by French patent application no. 2,828,027.

In this last, clever embodiment, shown in FIG. 2 for a number of poles equal to 28, the stators ($c_1$), ($c_2$) and ($c_3$) are all made in the same way ($b_{10}$), from two identical claws ($b_1$) and ($b_2$), gripping a coil ($b_3$). Said claws are assembled on one another, according to patent application no. 2,828,027, such that their respective teeth ($b_4$) and ($b_5$) of the two claws ($b_1$) and ($b_2$) are substantially equidistant. The claw ($b_1$) is placed on the claw ($b_2$), as indicated by arrow ($b_7$). The contact zones ($b_{30}$) between the claws ($b_1$) and ($b_2$) must be made correctly, so as to avoid unwanted magnetic air gaps in the contact zone. The shape of this contact zone ($b_{30}$) may not be made up of a coplanar plane along X/Y ($c_{12}$), but may adopt any other shape, such as an undulation or a crenulation, that would allow the relative angular wedging of said claws ($b_1$) and ($b_2$). The claw ($b_2$) is angularly offset relative to the claw ($b_1$). In the case of the stator of FIG. 2, said wedging angle ($b_6$) is substantially equal to half the electrical angle the machine, i.e., for this polarity of 14 pairs of poles shown in FIG. 2, the value of 12.857°.

It is important to note that the embodiments of FIGS. 1 and 2 consider that each tooth ($b_4$) and ($b_5$) forms a complete electric pole of the machine. In FIG. 1, we consequently have an assembly of mono-phase rotary electric machines, joined axially around a same rotor ($c_7$). Said rotor may be of several types, in particular synchronous, asynchronous or with a variable reluctance. The different embodiments known at this time for rotors are part of the state of the art and all adapt to the presence of a set of claw stators, as described in FIG. 1.

In the rest of this document, we will refer to the stators ($c_1$), ($c_2$) and ($c_3$) as structural phase, in order to clarify their role. Throughout the following description, we therefore consider the assembly formed by two claws (b1) and (b2), gripping a coil (b3), to form a complete structural phase. FIG. 3 more synthetically shows this proposal, by showing these two claws (a10) for (b1), and (a11) for (b2), which are joined against one another along the direction (a13), to form a single phase (a14), shown in FIG. 4, like that (b10) described above in reference to FIG. 2 and corresponding to the joining of two claws (b1) and (b2), gripping a coil (b3). At this stage of the description of the state of the art, note should be made of the interest in providing axial maintaining means for the claws (b1) and (b2) on one another, which may for example consist of an elastic gripping washer, mounted in any location of the rotation axis of the plane XY (c12). The state of the art broadly describes the shapes of the teeth, in order to improve the air gap flux and reduce the leakage fluxes.

All of these descriptions of FIGS. 1 and 2 are part of the state of the art. They include the version with an inverted stator, where the teeth (b4) and (b5) of the claws (b1) and (b2) are situated on the outer periphery, with a rotor that is situated outside the stator.

FIG. 3 shows how two claws (a10) and (a11) generically form a structural phase (a14a) or (a14b), this structural phase indifferently being able to form a rotary electric machine armature or inductor, depending on whether the coil (a15) is encompassed internally by the claws (a10) and (a11). The case shown by embodiment (a14a) corresponds to a machine with a so-called inverse structure, with an external rotor, where the coil (a15) is placed inside the rotor. The case shown by embodiment (a14b) corresponds to a machine with a so-called direct structure, with an internal rotor, where the coil (a15) is placed outside the rotor.

The state of the art clearly shows that the various elements of an electric rotary machine are interchangeable, in particular their relative internal or external position, as shown by FIG. 4. The structural phase (a14), made up of two claws (a10) and (a11), can be situated outside a part (a22), to then form a direct mono-phase rotary machine (a20b). The structural phase (a14), made up of two claws (a10) and (a11), can be situated inside a part (a21), to then form an inverse mono-phase rotary machine (a20a). The axial juxtaposition of these complete machines (a20a) or (a20b), angularly offset by an adequate angle, as known from the state of the art explained above, makes it possible to form a polyphase rotary machine.

In the presentation of FIG. 4, the parts (a14), (a22) and (a21) may indifferently be static or rotary. If a rotary part (a14) includes an integral coil, it is then necessary to power it with rings or any other system known by those skilled in the art (for example, rotary diodes).

The (a14) static and (a22) rotary magnets (or coiled inductor) combination corresponds to a so-called direct synchronous machine (a20b). The structural phase (a14) is then supplied with alternating current and according to the so-called brushless control methods known by those skilled in the art.

The (a14) static and (a21) rotary magnets (or coiled inductor) combination corresponds to a machine (a20a) forming a so-called reverse synchronous machine. The structural phase (a14) is then supplied with alternating current and according to the so-called brushless control methods known by those skilled in the art.

The (a21) static and (a14) rotary combination corresponds to a machine (a20a) forming a claw alternator, called Lundell, widely used in heat engines.

Any other combinations are possible, such as (a14) rotary and (a22) static, or (a14) rotary and (a21) static, or both parts (a14) and (a22) rotary, or both parts (a14) and (a21) rotary. These different combinations are widely described in the state of the art for rotary machines with a coplanar structure.

FIG. 5 shows a state of the art for homopolar rotary machines powered with direct current. FIG. 5 shows the traditional structure of a machine with a homopolar rotor (also called transverse flux electric machine) where a coplanar tetrapolar polyphase stator (a1) is placed around a rotor separated into two half-rotors (a2) and (a3), angularly offset relative to one another by 90 mechanical degrees. The rotor excitation coil (a4) is situated in the median joining plane of the two half-rotors (a2) and (a3). Once supplied with direct current, the coil (a4) generates a magnetic flux denoted 4), which radially traverses the air gap separating the rotor from the stator across from the zones denoted S on the side of the rotor (a3) and across from the zones denoted N on the side of the rotor (a2). As a result, half of the conductors of the stator (a1) do not receive any rotor magnetic flux and therefore do not participate in generating motor torque.

The use of this machines topology has therefore been reduced to specific applications, where the rotor must for example rotate very quickly, or where the ambient operating temperature was incompatible with the traditional winding techniques. The most remarkable application of this technology consists of a cryogenic machine, where the ceramic winding could not withstand being rotated.

These homopolar structures generally have the primary flaw of providing half of the torque that a similar coplanar machine could provide. This it is the main reason for their low rate of industrial use. The homopolar machine described in the state of the art led to the so-called dual homopolar machine, described in a limited version in French patent no. FR 10 60923-1, which is made by assembling homopolar machines with annular coils, around an annular magnetizing central coil. The flaw of this dual homopolar machine lies in the elimination of every other magnetic pole in its rotor, which leads to a significant loss of torque.

The pole forms of the state of the art are varied, and in mono-phase machines may for example assume the form of protruding poles. A mono-phase machine with protruding poles is then formed by one or two assemblies (g10) as described in FIGS. 6 and 7. In one version (g5), a part (g1) made from a ferromagnetic material receives a winding that may be interleaved (g3) or, in one version (g6), undulated (g4). The interleaved winding (g3) is characterized by the fact that each turn performs several revolutions around a same pole (g2), before going to the next pole (g2). An undulated winding (g4) is characterized by the fact that each turn passes around all of the poles (g2) of the part (g1) before returning to the same pole (g2). An undulated-interleaved combination is possible, and abundantly described by the state of the art.

The part (g1) is associated with a part (g13) that includes magnets (g12) or a winding surrounding polar parts (g12). As shown in FIG. 7, the right assembly (g10), enlarged in (g11) in the left part of the figure, forms a dual-protrusion mono-phase machine, where the current in the different windings can be direct or alternating. The assembly formed by (g12) and (g13) can be made by using a smooth pole structure, as abundantly described by the state of the art, through notches traversed by electric windings. The parts (g13) may either be internal or external with respect to the parts (g1).

It is possible to demonstrate that the so-called homopolar structures (a20a) and (a20b) of FIG. 4 are in fact mono-phase machines, which proceed from the same generic topology as (g1), as shown in FIGS. 6 and 7.

As previously indicated, the present invention relates to rotary electric machines with a homopolar structure (also called transverse flux electric machines), composite or the like. The rotary electric machines with a homopolar structure traditionally includes a stator and a rotor, at least the stator or the rotor being made up of at least one electric coil supported by a magnetic cylinder head. The rotary electric machine according to the present invention additionally includes at least two poles angularly offset by a substantially equal angular value. These poles can be made up of tabs or teeth secured to said annular cylinder head and bent parallel to the rotation axis of the machine, or by protuberances secured to said annular cylinder head, or made by notches arranged in the cylinder head, receiving conductors.

There may be multiple rotary parts, called rotors in the descriptions that follow, as well as multiple stationary parts, called stators. It is then possible to form a rotary electric machine including a single stator, or group of stators, associated with a single rotor, or several rotors or groups of rotors. By extension, it is possible to form a rotary electric machine including any number of stators or groups of stators, associated with any number of rotors or groups of rotors.

In this document, the notion of group of stators or rotors corresponds to the notion of electric phases. A polyphase rotary electric machine includes Npe electric phases, i.e., including Npe groups of independent coils, powered by an appropriate polyphase system. Said polyphase rotary electric machine is formed by Npe groups of elementary monophase rotary electric machines.

Throughout the following description, the rotors and stators can be mounted directly with the rotor inside the stator, or conversely, with the rotor outside the stator. Throughout the descriptions, the armatures and the inductors may be placed at the rotor and/or stator.

BRIEF SUMMARY OF THE INVENTION

The rotary electric machine with a homopolar structure according to the invention, including a number Npe of electric phases, is characterized in that it is made up of:
- a juxtaposition, along the rotation axis of the rotary electric machine, of at least one pair of armatures having a number Np of poles, placed on either side of at least one inductive coil, wound around the rotation axis of the rotary electric machine, the adjacent armatures being angularly offset by any electric angle $\Box$s, preferably comprised between 0° and 90°/2 Np; and
- at least one passive inductor made up at least partially of a ferromagnetic material, separated from the armatures by an air gap;

and in which one of the armatures and the inductor being rotatable and making up at least one rotor and the other of the armatures and the inductor being stationary and making up at least one stator.

According to one possibility, the inductor includes Np inductor bars oriented in an axial direction, substantially covering the axial length of the machine and attached to a support connecting them.

The inductive coil can, in some configurations, radially traverse the air gap all the way through each bar of the inductor, entering on one side and leaving from the other side so as to respectively pass above and below two adjacent parts of the inductor, in a radial direction. Alternatively, the inductive coil is situated completely between the armatures of the pair of armatures, and does not cross the air gap.

The inductor bars can be twisted, their axial ends being angularly offset. They can also be split into several portions respectively positioned across from the armatures and the zone including the inductive coil(s), the portion(s) opposite the zone including the inductive coil(s) being secured to the armatures. In this hypothesis, the portions of the inductor bars secured to the armature are angularly offset relative to said armature by any value, with a preferential value of 90°/2 Np, taken between the center of an armature pole and the center of the inductor bar secured to said armature.

According to one possibility, each armature of the pairs of armatures includes a magnetic cylinder head connecting their poles, said armatures being connected to flux return polar parts connecting the radial walls of the opposite armatures. Alternatively or additionally, the cylinder head can be made by flux return polar parts surrounding the non-radial walls of the distal armatures of the inductor. In many configurations, the cylinder heads and the flux return polar parts are cylindrical.

According to one possible configuration, the annular sector covered by the poles is 120 electrical degrees. Still according to one possibility specific to the invention, the armatures of the pairs of armatures separated by a coil are each made up of several elementary armatures.

In a configurational alternative, the inductor includes Np/2 inductor bars oriented in an axial direction, substantially covering the axial length of the machine and attached to a support connecting them to the rotation axis of the rotary electric machine. This alternative is suitable for machines for which the inductive coil is situated completely between the armatures of the pair of armatures, and does not cross the air gap.

According to still another alternative, the inductive coil can be replaced by a substantially annular magnet magnetized in the direction of the rotation axis of the rotary electric machine. In this scenario, said magnet can be arranged in contact with at least one flux concentrating ferromagnetic polar part.

The inductive coil can for example be twisted, annular or undulated in a transverse plane. If the inductive coil is supplied with alternating current, in the case of a polyphase machine, the inductive coils of the different phases can be coupled in a star, triangle or zigzag.

Such rotary electric machines with a composite homopolar structure can be formed very flexibly, and in particular include at least one stator or group of a plurality of stators associated with at least one rotor or group of a plurality of rotors. Likewise, an armature can be shared by several inductors or an inductor can be shared by several armatures. In the latter case, preferably, a coupling part made from a ferromagnetic material can connect the several inductors or the several armatures.

In the case of still another alternative, with a machine whose rotor includes permanent magnets on a wall situated across from the stator(s), the magnets can be inclined relative to a plane tangential to said wall situated across from the stator(s). Moreover, free surfaces of the poles bordering the air gap can be inclined in an axial direction, linearly or curved. Likewise, the free surface of a pole bordering the air gap can be asymmetrical in a transverse direction relative to a median axial plane of the pole containing the rotation axis.

It has previously been seen that there were several possible embodiments of magnetic poles in the rotary machines according to the invention. In the scenario where the poles of the armatures are made up of teeth including a radial leg connected via a foot to the cylinder head and an axial tip, said teeth of each armature being separated by an angular distance allowing the head-to-tail nesting of another armature with an identical toothed structure in order to form the pair of armatures around the inductive coil, the tip can include at least one stair step indentation. This indentation is preferably situated at a radial distance from the rotation axis of the rotary electric machine substantially equal to the radial distance from the wall of the cylinder head extending in an axial direction from which the teeth protrude. Furthermore, this indentation can include a wall situated in a median transverse plane of the pair of armatures, used for the head-to-tail nesting of two armatures.

To improve the magnetic characteristics of the motor, the teeth preferably flare toward the lateral lugs at their connection to the cylinder head. They can also be separate from the cylinder head, in which case the cylinder head may have hollows for fastening of the teeth.

According to the invention, the inductive coil can be wound in a twisted manner, sinusoidally, around the feet of the teeth of the armatures of the pair of armatures surrounding the inductive coil. To facilitate the passage of the inductive coil, the sections of the legs of the teeth can preferably have, in at least one cylindrical surface coaxial to the rotation axis, side walls parallel to one another, in particular in a single piece or stair stepping. Also alternatively, said sections may include curved side walls.

According to one possibility that may prove interesting for manufacturing, the tips of the teeth can also be separate and attached on the legs.

When the rotary electric machine of the invention is a polyphase machine, it is preferably made up of a coaxial juxtaposition of mono-phase machines according to the preceding claims, regularly offset by an electric angle of 360°/2 Npe. In its polyphase version, it may alternatively be made up of a coaxial juxtaposition of angularly aligned mono-phase machines, an inter-phase phase shift being caused by the rotation, at the rotor, of the magnets or coiled inductors or polar protrusions. For these polyphase machines, intermediate coils may be arranged between the mono-phase machines.

The following list non-exhaustively contains various possible alternative applications of the invention in a rotary electric machine:
  synchronous machine with rotors with magnets or wound rotors,
  synchronous machine with rotors with magnets made from plasto-magnets, i.e., made from a resin-impregnated magnetic powder,
  asynchronous machine with cage or wound rotor,
  variable reluctance machine, with passive or active (magnetized) rotor.
  the relative arrangement of the different parts (a14), (a22) and (a21), to form a machine of type (a20b) or (a20a), leads to a machine with an external stator or with an internal stator, called inverted,
  mono-phase, dual-phase, three-phase or polyphase machine, obtained by axial stacking of elementary machines (a20b) or (a20a) correctly phase shifted relative to one another by an electric angle substantially equal to an electric revolution (360° divided by the number of pairs of poles) divided by the number of phases, said annular phase shift being able to be created at the rotor or the stator,
  polyphase machine, including at least one structural phase, where each electric phase is made up of several elementary machines (a20b) or (a20a) electrically connected in series or electrically in parallel,
  polyphase machine, including at least one structural phase, where the structural phases (a14) are all angularly aligned and where the inter-phase phase shift is caused by the rotation of the rotor, either of the magnets, or of the wound inductors, or of the conductors of the additional part (a22) or (a21), or of the polar protrusions,
  polyphase machine, including at least one structural phase, with the coils (b3) are divided into several separate windings, which in turn are coupled to from one phase to another in a zigzag, star or triangle to form a complete polyphase machine,
the assembly can also form a static transformer, where all of the parts (a14), (a22) and (a21) being static, they form a static phase shifter.

Of course, the different features, alternatives and/or embodiments of the present invention can be associated with one another in various combinations inasmuch as they are not incompatible or mutually exclusive.

BRIEF DESCRIPTION OF THE SEVERAL VIEWS OF THE DRAWINGS

The present invention will be better understood and other features and advantages thereof will appear upon reading the following detailed description comprising embodiments provided as an illustration in reference to the appended figures, shown as non-limiting examples, which may serve to complete the understanding of the present invention and the description of its production and, if applicable, contribute to its definition.

DETAILED DESCRIPTION OF THE INVENTION

Figure 8:
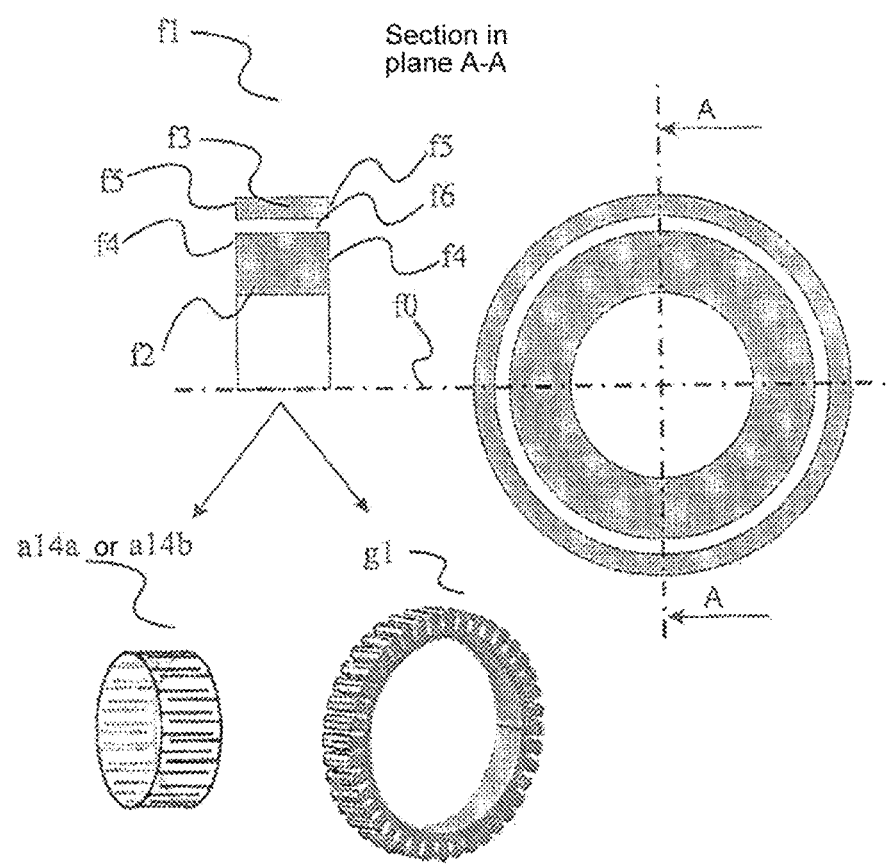
FIG. 8 diagrammatically shows schematic, sectional and perspective views of a mono phase rotary electric machine according to the invention.

In a first embodiment, the inventions described in this document use a mono-phase machine (f1) described in FIG. 8, which will be called structural phase, made by joining at least two parts (f3) and (f2), substantially centered around a same axis (f0), said parts being separated by an air gap (f6) that substantially follows a cylinder, which is substantially centered on the axis (f0), or a disc, which is substantially centered on the axis (f0), or a combination of the two (cylinder and disc), each independently made up either of parts in the form of claws (a14a) or (a14b), or in the form of protruding poles (g1), or in the form of a smooth pole machine, said smooth pole structure being characterized by the presence of conductors arranged along an air gap surface, and are either buried in notches or on the surface. The conductors are then comparable to an air gap linear current density, as abundantly described by the state of the art, said smooth pole machine (g1a) being able to be mono-phase or polyphase, with any number of phases, greater than or equal to one.

The parts (f2) and (f3), made using a form (a14a) or (a14b) or (g1) or in smooth poles, is characterized by a number of poles, denoted Np throughout this document, which, according to the conventions of the state of the art, is equal to the number of alternations of passages in the air gap (g6) by the flux generated by the parts (f2) and (f3), said flux passages being considered when the parts (f2) and (f3) are powered independently of one another, each by a constant direct current.

In this document, the angles will be denoted in two ways. When the angle is said to be mechanical, it corresponds to the absolute angle, counted over one complete mechanical revolution. When the angle is said to be electrical, it corresponds to the mechanical angle divided by the number of pairs of poles, i.e., by Np/2. All of the electrical angles are counted modulo 360 electrical degrees.

The notion of armature corresponds to a part whose coil is supplied with alternating current. The notion of inductor is related to a set of parts whereof the coil is supplied either with direct current or with alternating current, which will for example be the case for the stators of synchronous induction motors. The notion of inductor includes the parts that receive magnets. A machine may include one or several armatures and one or several inductors. A machine must include at least one armature and at least one inductor.

It must be specified that the notion of protrusion includes inductors with magnets.

Figure 37:
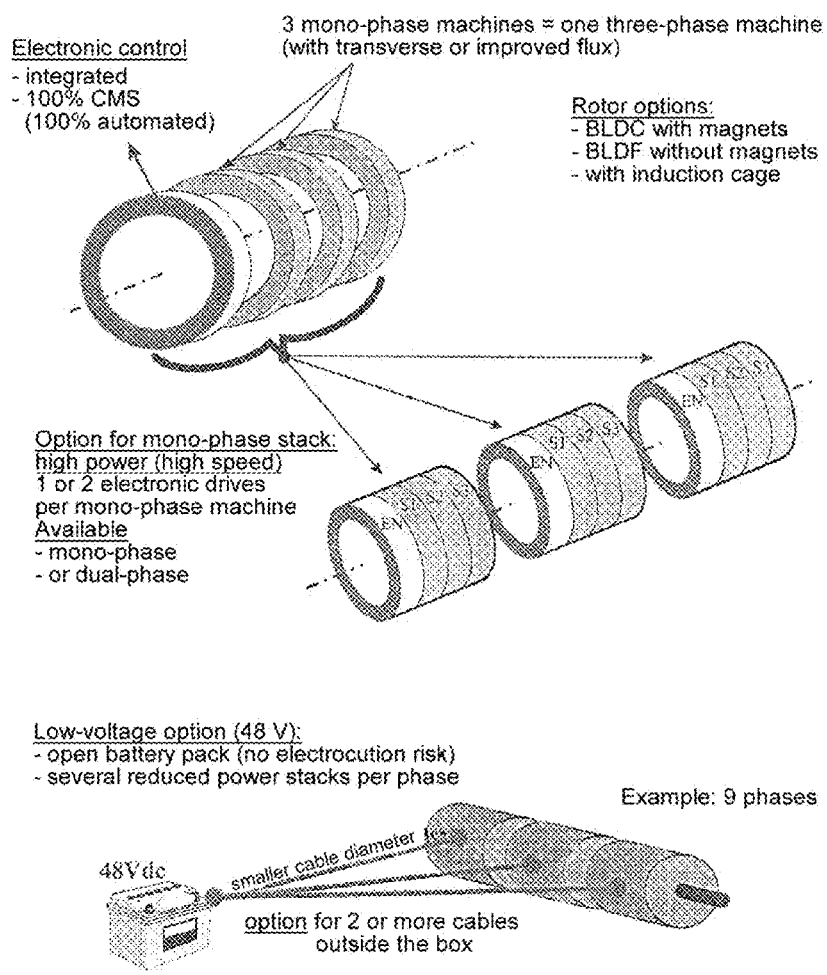
FIG. 37 shows schematic views of different solutions for cooperation between a motor according to the present invention and the electronic control.

FIG. 37 shows various solutions for the arrangement between the electric motor according to the invention and its adjustable drive.

Figure 9:
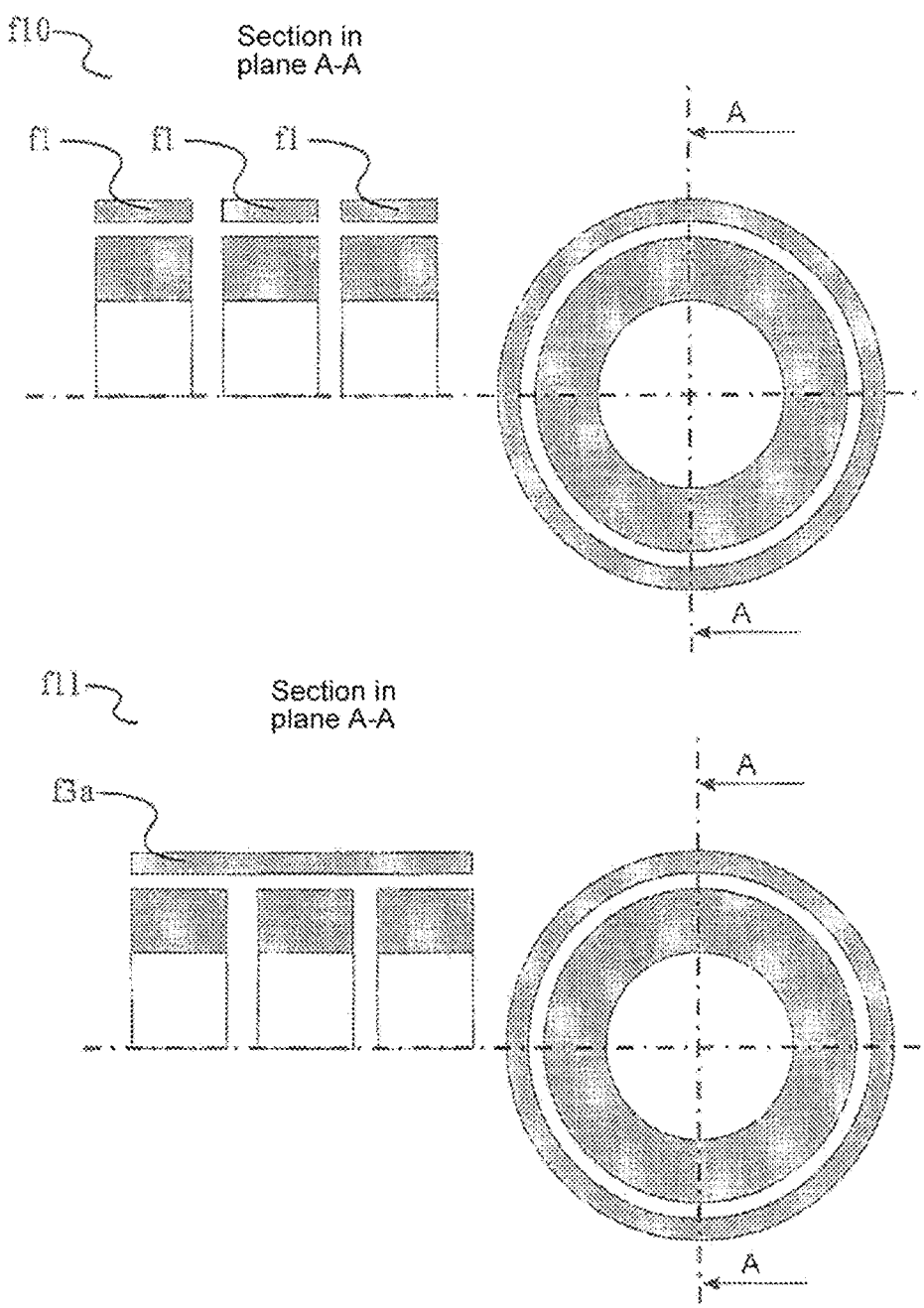
FIG. 9 diagrammatically shows sectional views of a polyphase rotary electric machine or an assembly with several mono-phase rotary electric machines according to FIG. 8.
Figure 10:
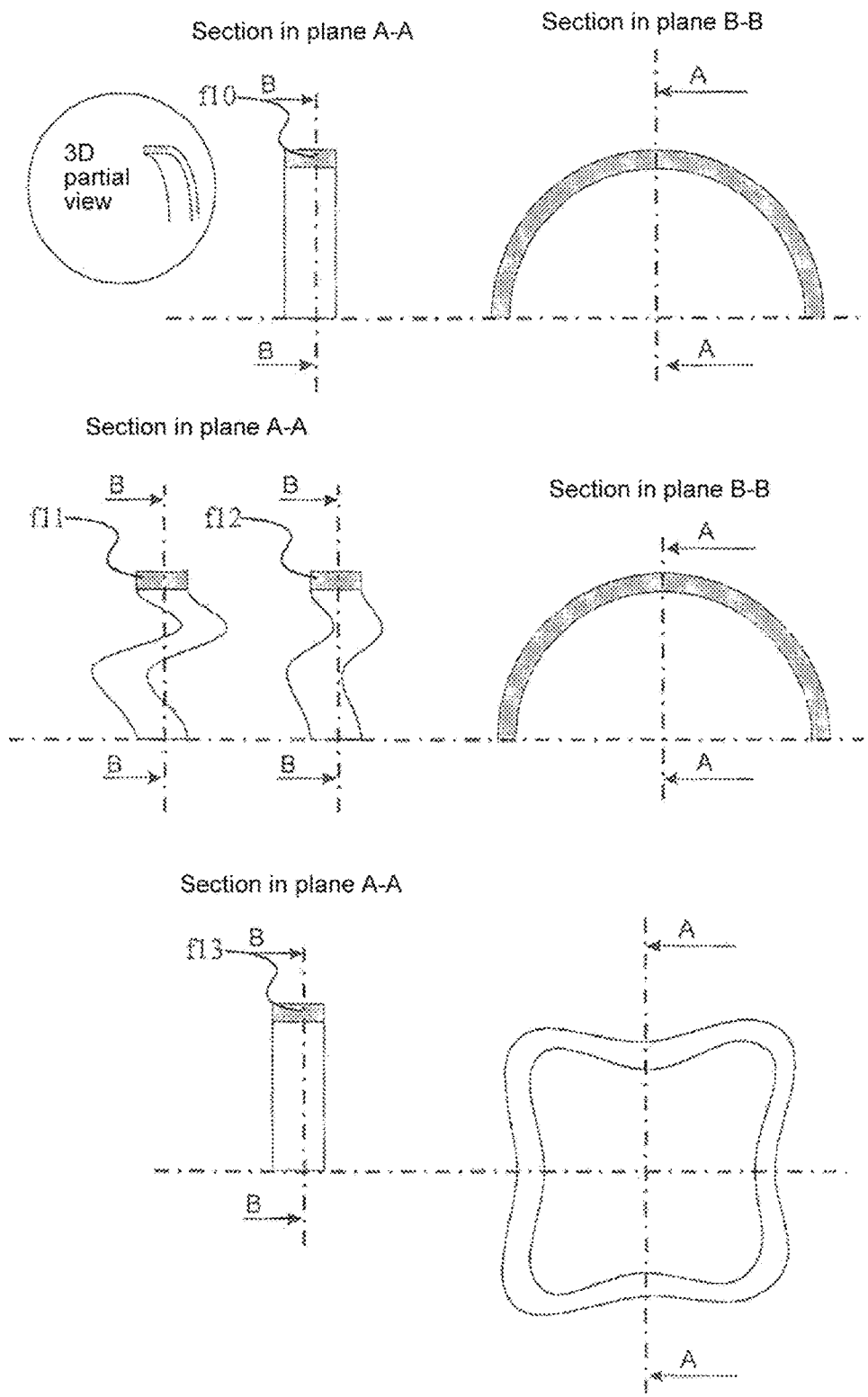
FIG. 10 shows sectional and schematic views of different types of coils used in the mono-phase rotary electric machines according to the invention.
Figure 11:
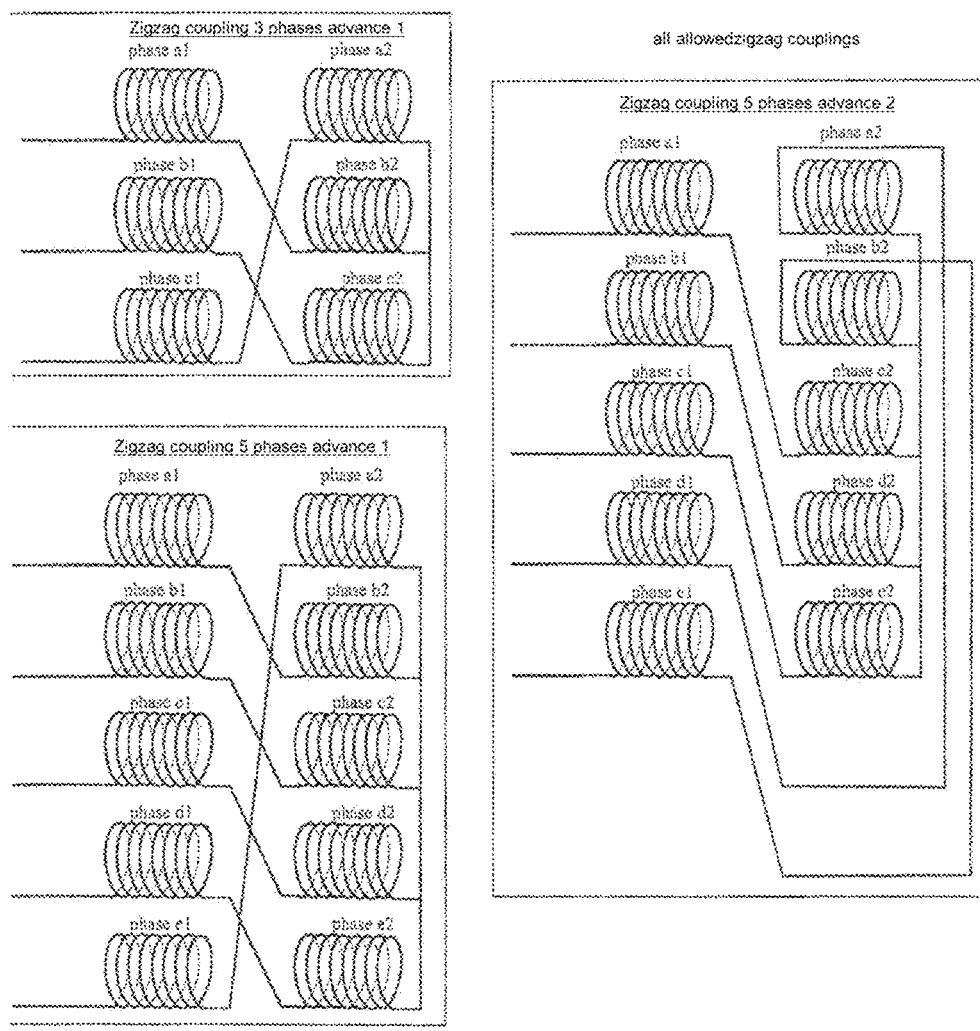
FIGS. 11 and 12 show schematic views of the electrical coupling modes that can be used for the coils of several mono-phase rotary electric machines according to the invention.
Figure 12:
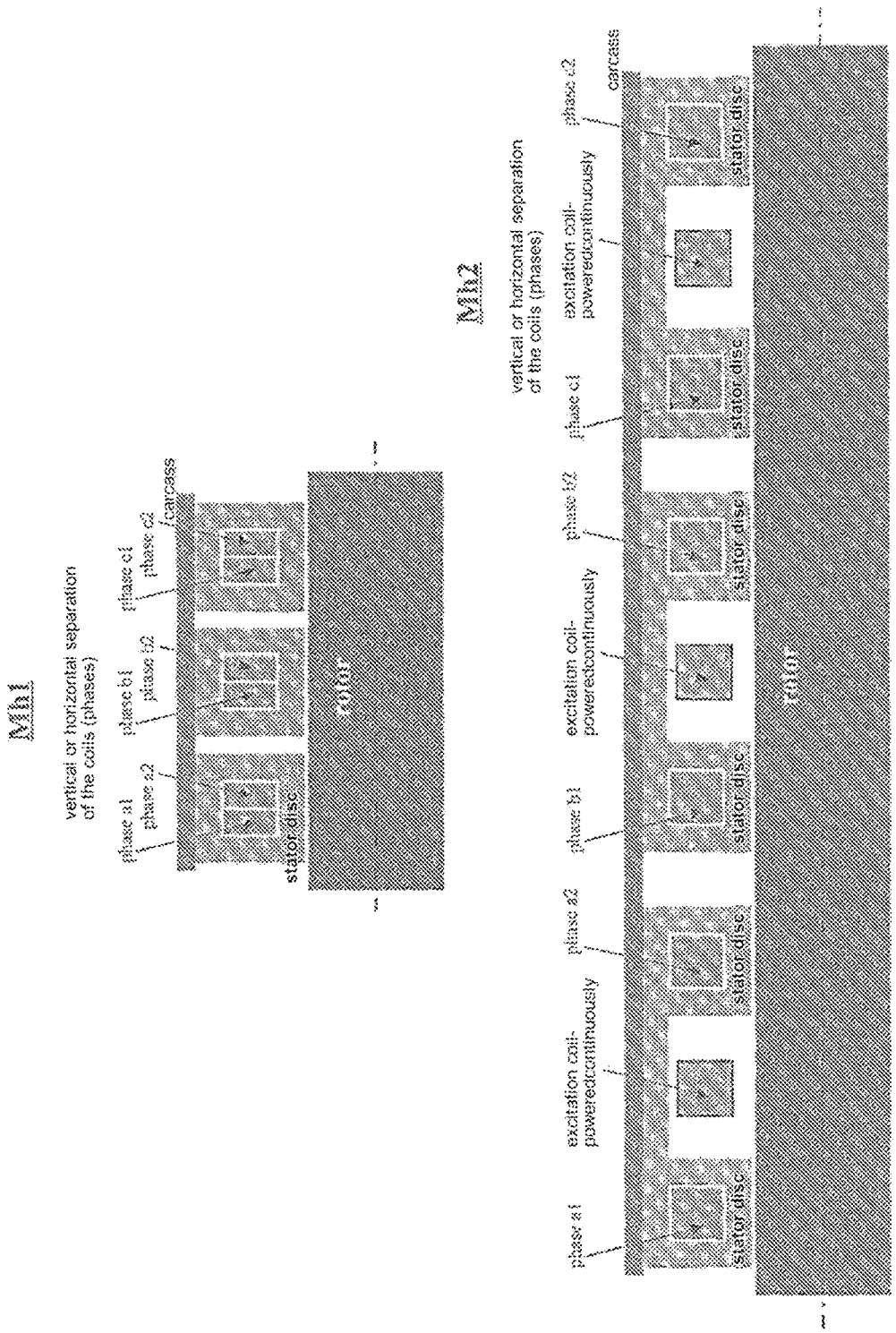
Figure 13:
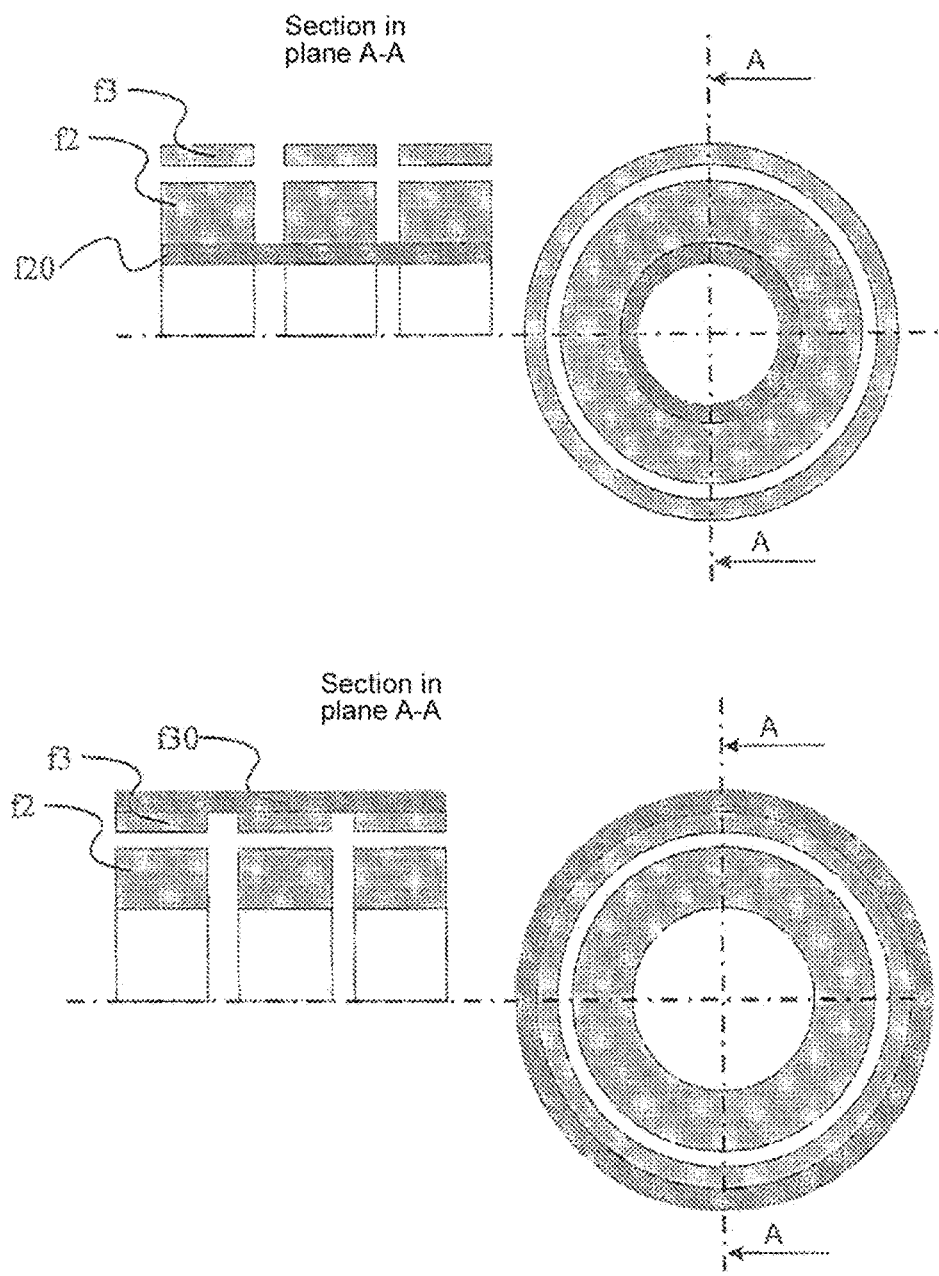
FIG. 13 shows sectional views illustrating the magnetic coupling of parts of mono-phase or polyphase rotary electric machines according to the invention.
Figure 22:
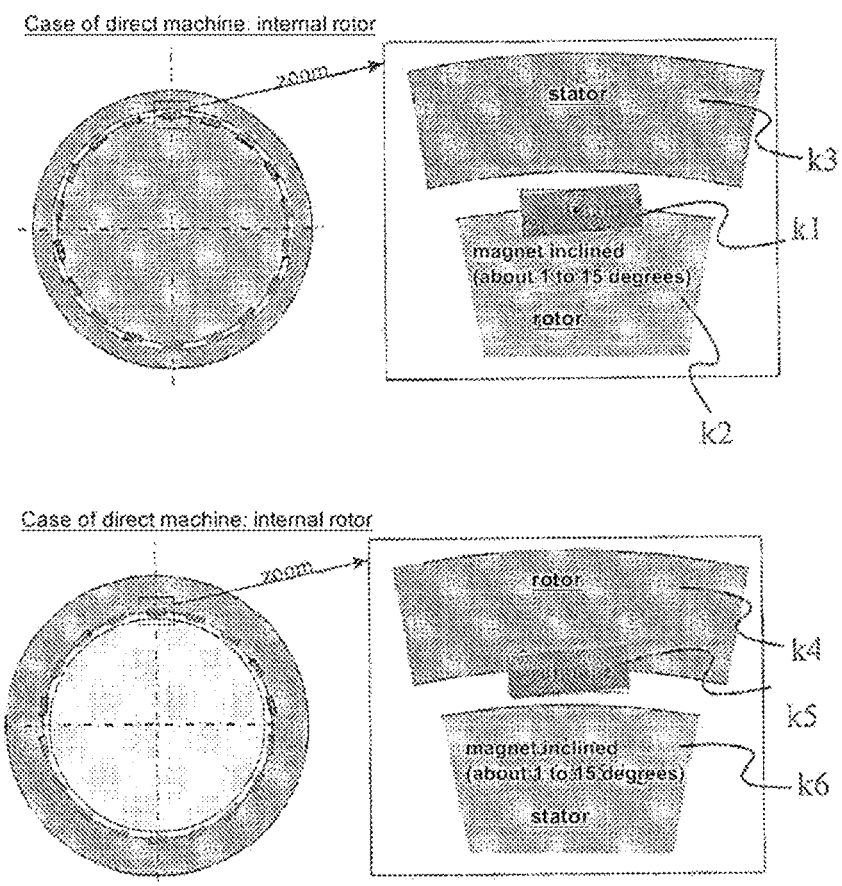
FIG. 22 shows sectional views of an example of an inclined installation of magnets of a rotor made up of permanent magnets according to the invention.
Figure 23:
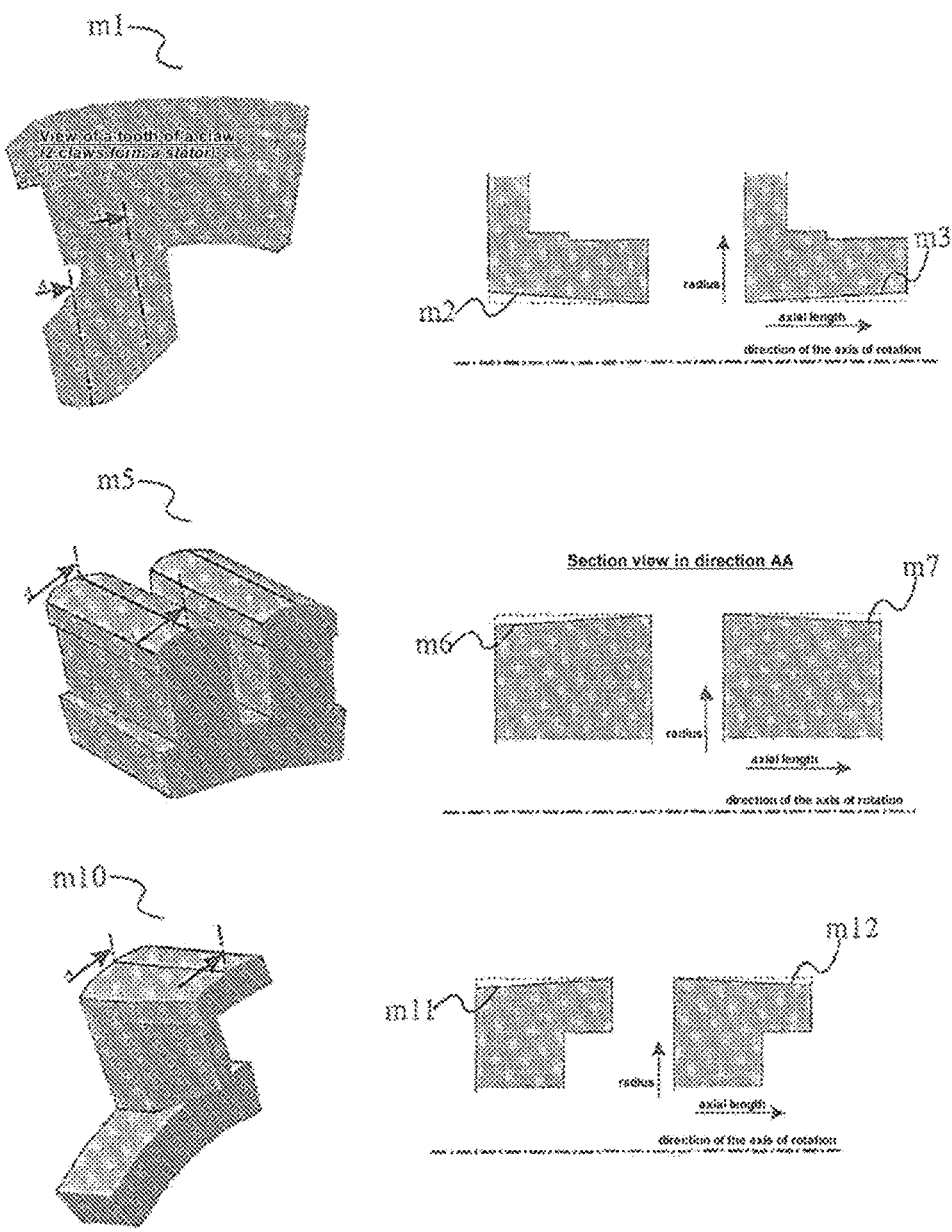
FIGS. 23 and 24 show perspective and sectional views illustrating an embodiment of modulation of a width of the air gap by incline or a symmetry of the poles according to the invention.
Figure 24:
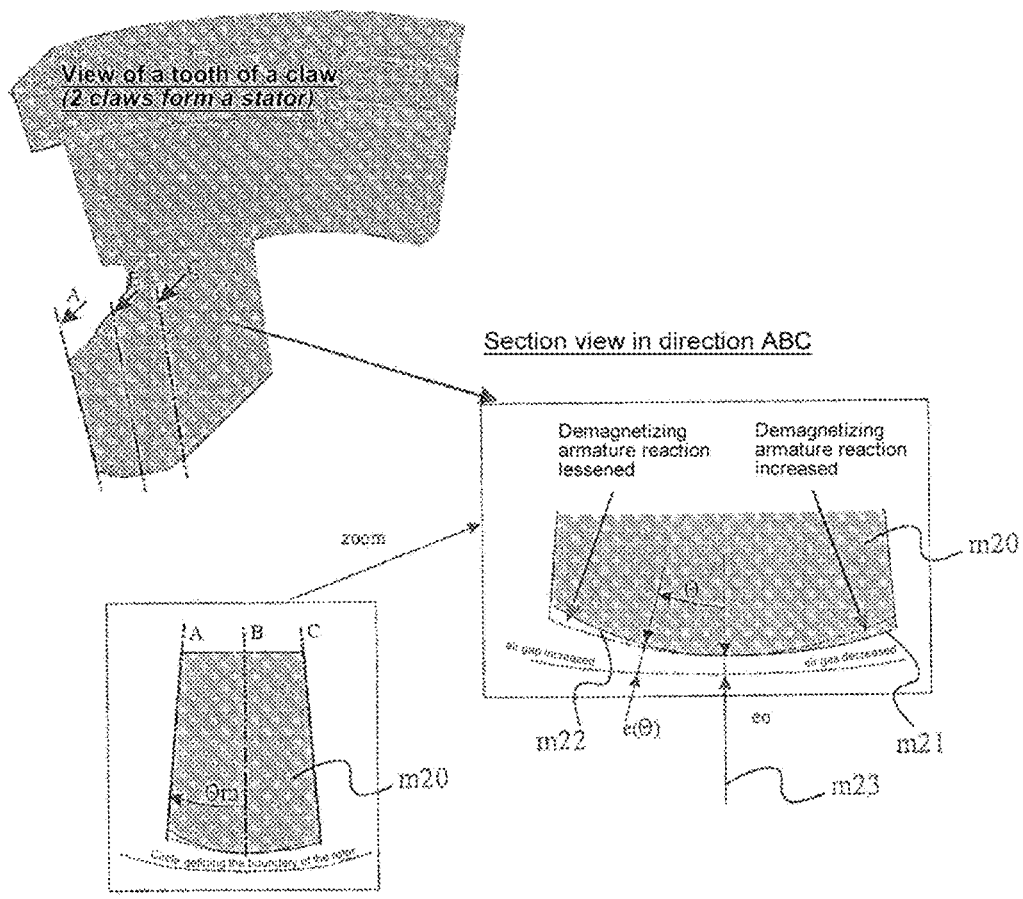
Figure 25:
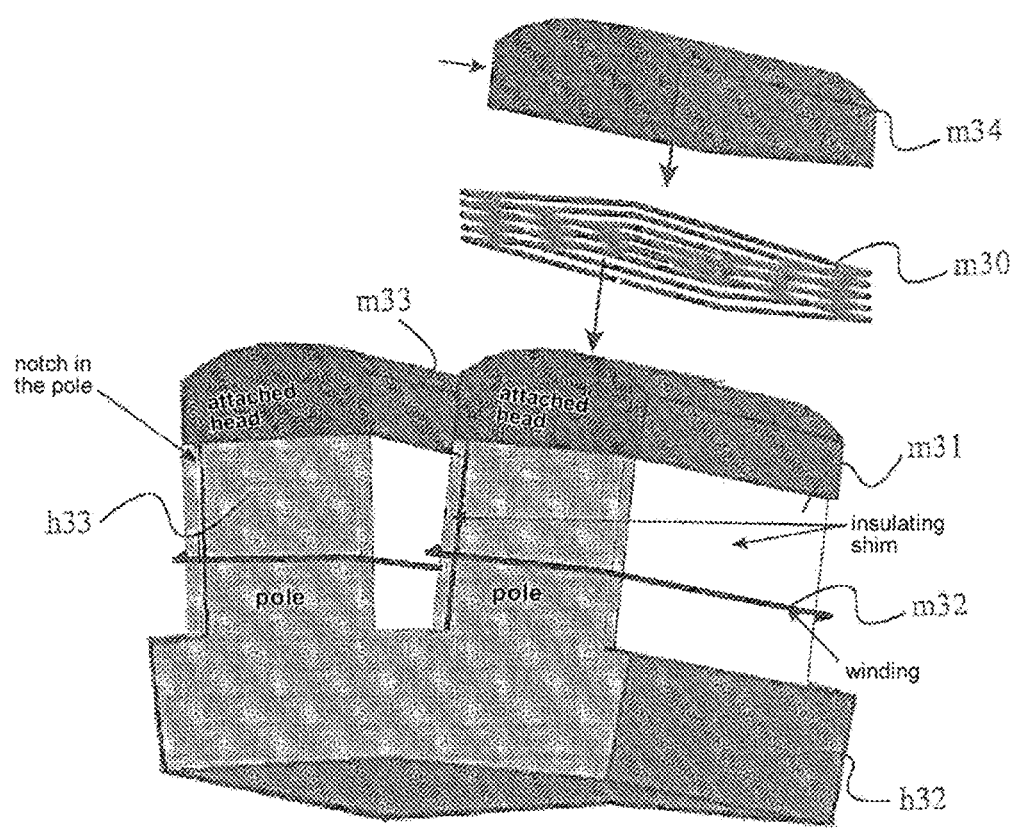
FIG. 25 shows an exploded perspective view of one particular embodiment of a tooth or a pole, in two parts according to the invention.

All of the inventions described in this document lead to producing polyphase electric machines, including at least one electric phase, with the alternatives formed by any combination of the following 34 options:

1. the armatures are stationary (case of so-called synchronous machines) or rotary (case of direct current machines); in the latter case, the power supply of the machine is done via an electromechanical system of the collector/brush type, as the state of the art describes for DC brush machines;
2. each of the parts (f2) and (f3) is an inductor or armature, rotor or stator. Combined, they form a rotary electric machine including an identical number of electromagnetic poles in a first embodiment, and different in a second embodiment;
3. in a first case, the stator(s) are external and the rotor(s) are internal, said structure being said to be direct; in a second case, the stator(s) are internal and the rotor(s) are external, said structure being said to be inverse; in a third case, some of the stators are internal and the other stators are external, associated with some of the rotors that are internal and the rest of the rotors that are external;

4. as described in FIG. 10, the coils used in the mono-phase machines may either have an annular shape (f10) or an irregular shape; in the latter case, the irregularity may result in a first embodiment in an undulation (f11) or (f12) around a discoid plane substantially perpendicular to the rotation axis (f0), in a second embodiment by an undulation (f13) around a cylindrical tube substantially centered on the rotation axis (f0) (the undulation may overhang the central axis or the lateral edges of the coil), or in a third embodiment, a combination of the previous two solutions;
5. there may be any dimensions and shape of the coils (f10) in the cylindrical cutting plane;
6. the lateral flanks corresponding to the extreme lateral edge along the axis (f0) of the electromagnetic phases forming the parts (f2) and (f3), said lateral flanks (f4) and (f5) (see FIG. 8) of the parts (f2), (f3), respectively, are, in a first embodiment, aligned along the same discoid plane centered on the axis (f0), or in a second embodiment, said lateral flanks (f4) and (f5) are not aligned, the internal part (f2) being able to be axially longer or shorter than the external part (f3);
7. the parts (f2) and (f3) can use a same structure, or may have different shapes and sizes, or use a different mono-phase machine structure;
8. the parts (f2) and (f3) include at least one coil or at least one magnet, which provide a flux at the air gap separating them, said flux following a direction that is either radial or axial, or along a radial and/or axial path;
9. a polyphase machine is formed by substantially aligning, around the same axis (f0), at least two mono-phase machines (f1), which form a machine including either as many electric phases as there are mono-phase machines (f1), or a number of electric phases smaller than the number of mono-phase machines (f1); preferably, said number of mono-phase machines (f1) is a multiple of the number of electric phases;
10. one of the two parts (f2) or (f3) forming each mono-phase machine (f1) can be shared by all (or part) of the opposite parts; for example, in FIG. 9, the machine (f11) has all of the parts (f3) combined in a single part (f3*a*); all combinations are possible, i.e., joining all or some of the parts (f2) across from different parts (f3) or parts joined partially or completely, or the opposite, respectively, the parts (f3) joined across from parts (f2) partially or completely, the lateral flanks of the parts (f2) and (f3), or groups of parts (f2), or groups of parts (f3), may not coincide in a discoid plane centered on the axis (f0);
11. in a first embodiment, the mono-phase machines (f1) can be made from so-called homopolar machines (a14) (see FIGS. 3 and 4), as described in the state of the art and the inventions that follow; in a second embodiment, the mono-phase machines (f1) can be made from machines with protruding poles (g1); in a third embodiment, the mono-phase machines (f1) can be made from machines with smooth poles (g1*a*); in a fourth embodiment, the mono-phase machines (f1) can be made from any combination of (a14), (g1) and with smooth poles;
12. each of the parts (f2) and (f3) includes either at least one electric winding, or at least one magnet, or at least one short-circuited cage as known in the state of the art for asynchronous induction machines, or no coil or magnet, this case corresponding to the variable reluctance machine; note that the two parts (f2) and (f3) preferably form an electromagnetic system with a same polarity, i.e., generating an electromagnetic flux including, at the air gap, as many recessed zones as there are protruding zones, the separating surface being considered to define the junction between the parts (f2) and (f3);
13. the electric coupling of the coils of the different mono-phase machines (f1) can form an electric star, an electric triangle, or any combination of these two shapes, as the state of the art proposes, for example zigzag coupling, as described in FIGS. 11 and 12;
14. the number of electric phases is equal to at least one, and may assume any value greater than the unit;
15. the number of pairs of poles of each mono-phase machine (f1) is either identical or different so as to form a multi-speed machine;
16. the different axially aligned mono-phase machines (f1) are either joined or are separated from one another with an axial separating shim, and/or intermediate coils;
17. the angular offset, along a discoid plane centered on the axis (f0), between the different axially aligned mono-phase machines (f1), is free, on the condition that the sum of all of the successive angular offsets between the different mono-phase machines (f1) from the first machine to said first machine is equal to zero for a mono-phase machine, or is equal to half of an electric revolution (180°) for a dual-phase machine, or is equal to a complete electric revolution (360°) for polarities greater than or equal to three phases; preferably, said annular offset is substantially similar for all of the mono-phase machines (f1);
18. the annular offset, along a discoid plane centered on the axis (f0), between the different mono-phase machines (f1), can be distributed over the two parts (f2) and (f3) forming them, either symmetrically, or symmetrically or regularly or irregularly asymmetrically, or by concentrating them on only one of the two parts (f2) or (f3), the opposite part then being formed by aligned parts;
19. the coils used in the mono-phase machines (f1) can be made with conductive wire chosen non-exhaustively from the following list, homogenously or in mixture: copper, aluminum, polymer, etc.;
20. the coils used in the mono-phase machines (f1) can be made with conductive wire insulated with any one or any combination of methods chosen non-exhaustively from the following list: either a flexible or rigid electric insulator, made by taping, a liquid or pasty resin, applied by dipping, brush, immersion, gun, which is drip-dried or dried by curing in an oven or by natural drying, which is refined by a passage in an air space;
21. the coils used in the mono-phase machines (f1) can be made with conductive wire insulated by an electric insulator that may be alumina obtained by aluminum oxidation, or by a ceramic attached and transformed either cold or by curing of the final coil;
22. the coils used in the mono-phase machines (f1) can be made with conductive wire whose shape is chosen non-exhaustively from among the following list: round, elliptical, square, rectangular, trapezoidal, octagonal, hexagonal, thin strip;
23. the coils used in the mono-phase machines (f1) can be made with conductive wire that receives an extra insulating system in addition to the insulation of each elementary conductor, this insulating system being able to be applied either on the group of wires forming a complete or partial coil, or directly on the ferromagnetic parts forming the electromagnetic circuit;
24. it is possible to combine a machine with smooth poles with one or several mono-phase machines, which is particularly interesting to produce an asynchronous machine;

25. it is possible to magnetically couple all or some of the parts (f2) forming a polyphase or mono-phase machine with a part (f20), as shown in FIG. 13, said part (f20) being made from a ferromagnetic material, said part (f20) having a substantially cylindrical or substantially discoid shape, said coupling making it possible to improve the electric coupling between successive structural phases;
26. it is possible to magnetically couple all or some of the parts (f3) forming a polyphase or mono-phase machine with a part (f30), as shown in FIG. 13, said part (f30) being made from a ferromagnetic material, said part (f30) having a substantially cylindrical or substantially discoid shape, said coupling making it possible to improve the electric coupling between successive structural phases;
27. each of the ferromagnetic parts used in the inventions can be made with any one of the technological solutions chosen from among the following non-exhaustive list: ferromagnetic sheet metal that is stamped or cut, insulated, straight or twisted and assembled, maintained by punching or welding, etc., solid steel, cold- or hot-pressed iron powder, iron powder that has been cold- or hot-pressed, then heat-cured, ferrite, sintered iron powder;
28. when magnets are used to form the rotor of a mono-phase machine (f1), (f10) or (f11), it is possible to incline said magnets relative to a plane tangential to a cylinder centered on the rotation axis of the machine, as described in FIG. 22, in the case of the direct version (k1), (k2), (k3) and in the case of the inverted version (k4), (k5), (k6);
29. the upper parts, which are opposite the air gap, teeth or poles can be inclined in the axial direction, as for example shown by FIG. 23, in three different embodiments (m1), (m5) and (m10), the incline can follow a straight line, or a curve with any shape, the interest of this incline being to cause partial saturation of the zone corresponding to the smallest air gap, in order to modulate the armature reaction;
30. the upper parts (m20), which are opposite the air gap, teeth or poles, can be symmetrical or asymmetrical in the polar direction, as shown for example by FIG. 24, where the angle $\theta$ represents the electric angle counted from the center (m23) of the tooth or pole, and where the air gap $e(\theta)$ can either be constant, or follow the law $e(\theta)=eo/\cos(\theta)$, or follow a different law depending on the sign of $\theta$, which may for example be $e(\theta)=eo$ for positive angles $\theta$, and $e(\theta)=eo/\cos(\theta)$ for negative angles $\theta$, or follow any linear or nonlinear function, or follow a linear law in the form of cut, rounded, elliptical faces;
31. the electric angle defined by the extreme edge of the tooth or pole (m20) has an optimal value of 60 electric degrees, the electric angle being counted from the center of the pole;
32. FIG. 25 shows a clever embodiment of a tooth (h20) or a pole (h30) in which the interleaved (or undulated) coil (m30) is inserted on the body of the tooth (h33), which next receives its cap (m34), such that the coil (m30) can be worked separately, before it is inserted on (h33);
33. the coils of the different parts (f2) and (f3) making up each mono-phase machine (f1) can each be made independently in an interleaved or undulated manner;
34. the power supply of the coils of the parts (f2) or (f3) can be electronic, or it can use a mechanical brush collector, like those used in DC machines.

As previously seen, one important aspect of this type of machine lies in the shape of the teeth or poles. In particular, within the meaning of the present invention, the change in the shape of the tooth or of a pole of a mono-phase machine part (f2) or (f3) is provided, so as to reduce the leakage flux thereof. Consider a polyphase machine (f10) or (f11) as described in FIG. 9, this machine being made up of an axial stack of mono-phase machines (f1) of FIG. 8.

Figure 1:
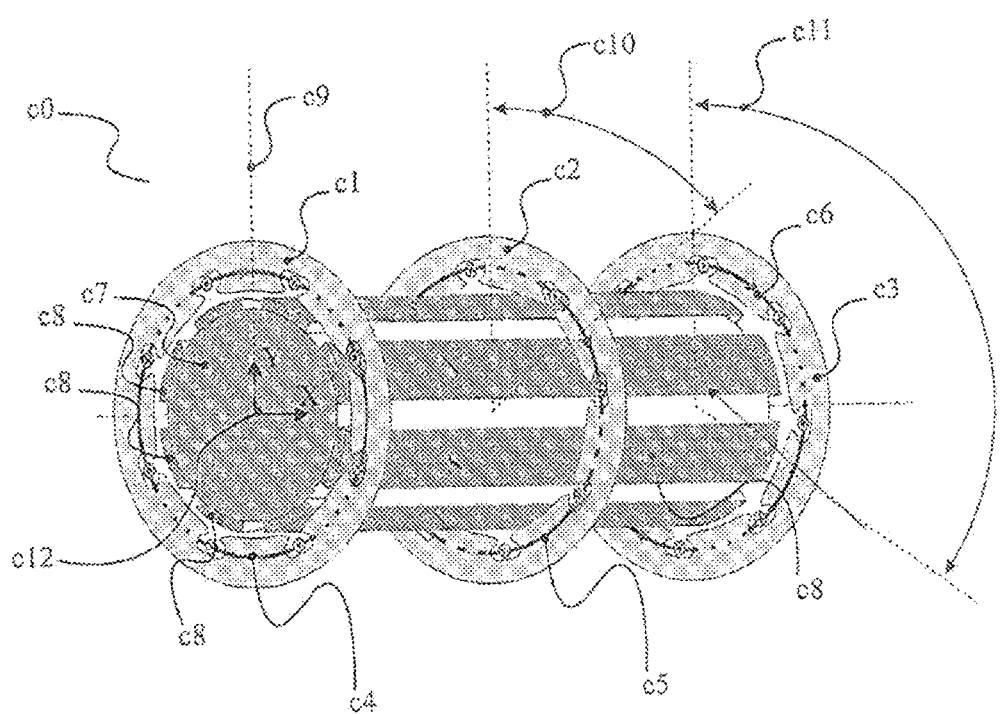
FIG. 1 is a schematic view of a rotor of the prior art.
Figure 2:
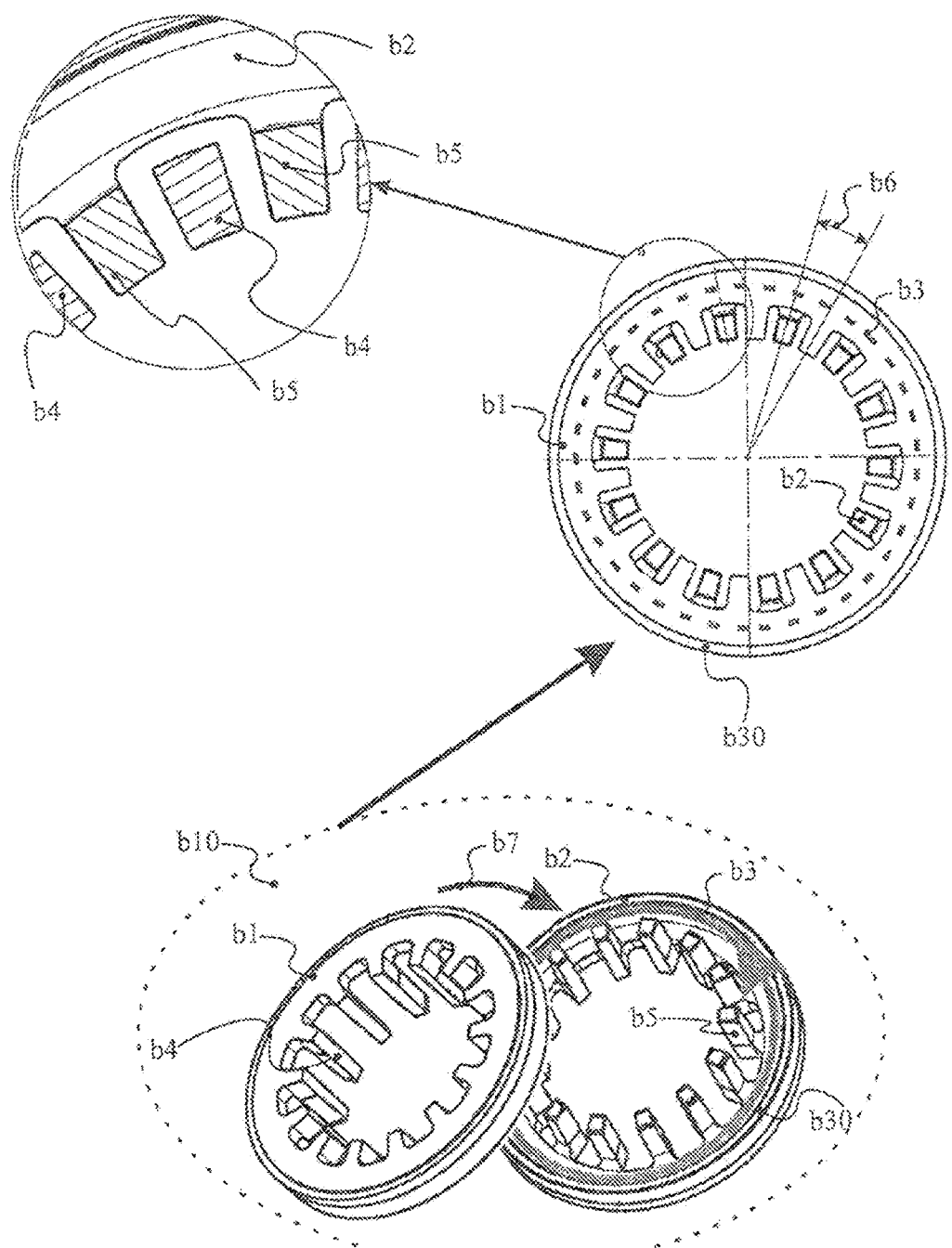
FIG. 2 includes perspective, end and enlarged schematic views of claws for grasping a coil of the prior art.
Figure 3:
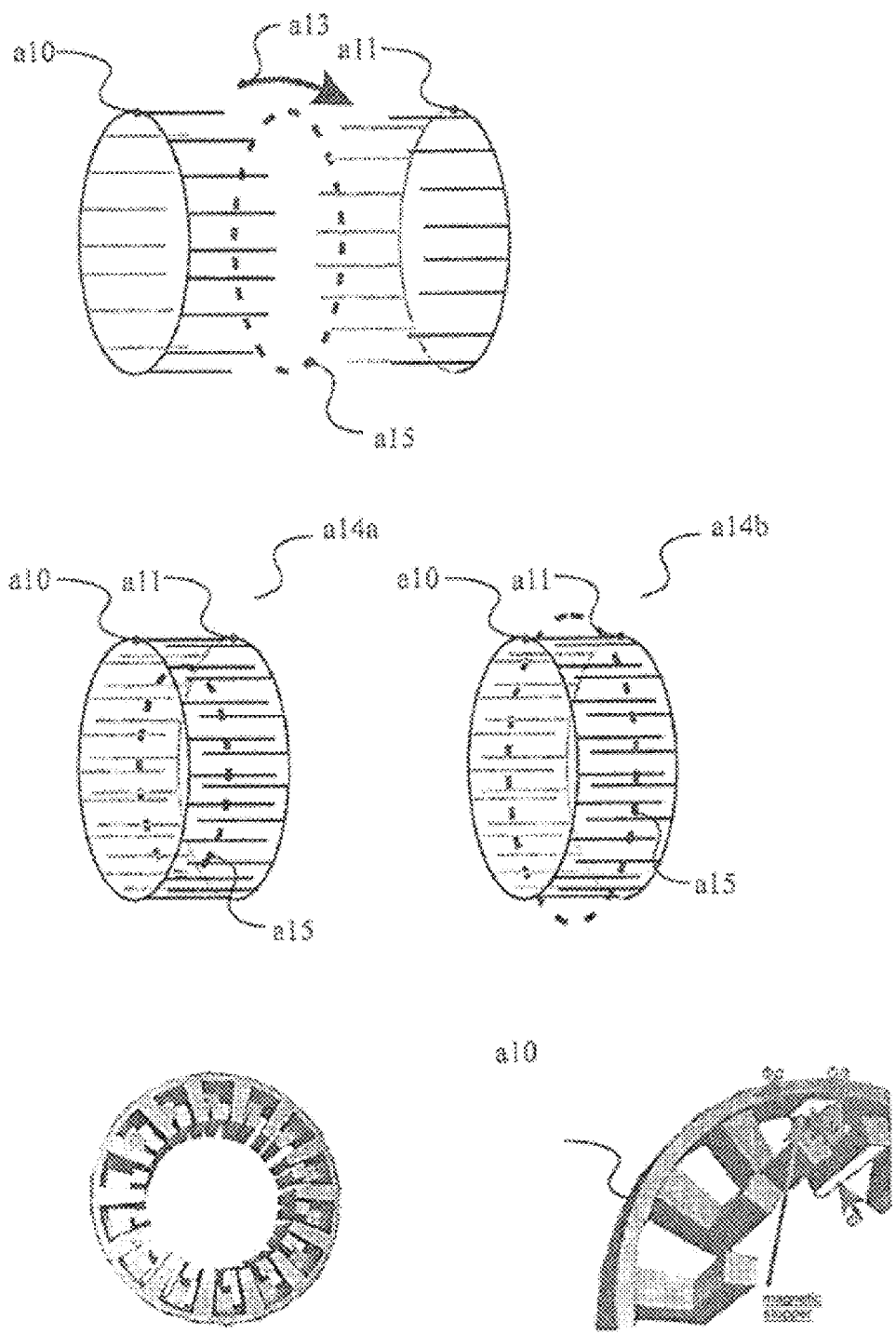
FIG. 3 includes schematic and perspective views of claws for grasping a coil of the prior art.

FIG. 3 describes the state of the art of a mono-phase machine (a14) with symmetrical claws. This FIG. 3 explains that the air gap flux passes completely in the reduced flux section at the fitting between the foot of the tooth and the stator cylinder head.

Figure 14:
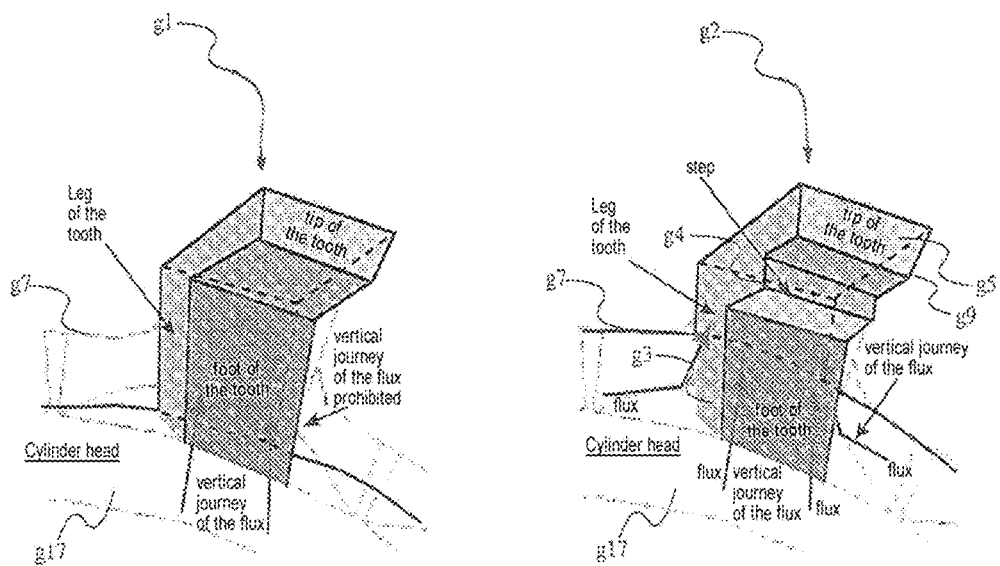
FIG. 14 shows schematic views of an embodiment of a tooth according to the invention.

FIG. 14 describes an improvement (g1), known from the state of the art, to the preceding problem of concentrating the flux at the fitting of the tooth foot on the stator cylinder head.

FIG. 14 describes an invention (g2) that makes it possible to greatly decrease the flux concentration at the fitting of the tooth foot on the stator cylinder head. The foot of one of the teeth, used in a claw (a14), (g3) receives a stair step (g4), which makes it possible to laterally return that the flux toward the body of the cylinder head (g17). The magnetic flux returned from the tip (g5) of the tooth toward the stator cylinder head (g17) then follows a path that is no longer radial, but three-dimensional. It is possible to produce several stair steps (g4), or to give the tooth foot an axially inclined shape (in the rotation direction). Preferably, the indentation (g4) is situated at a radial distance (g9) from the rotation axis, substantially equal to that (g7) of the upper edge of the cylinder head (g17).

Figure 15:
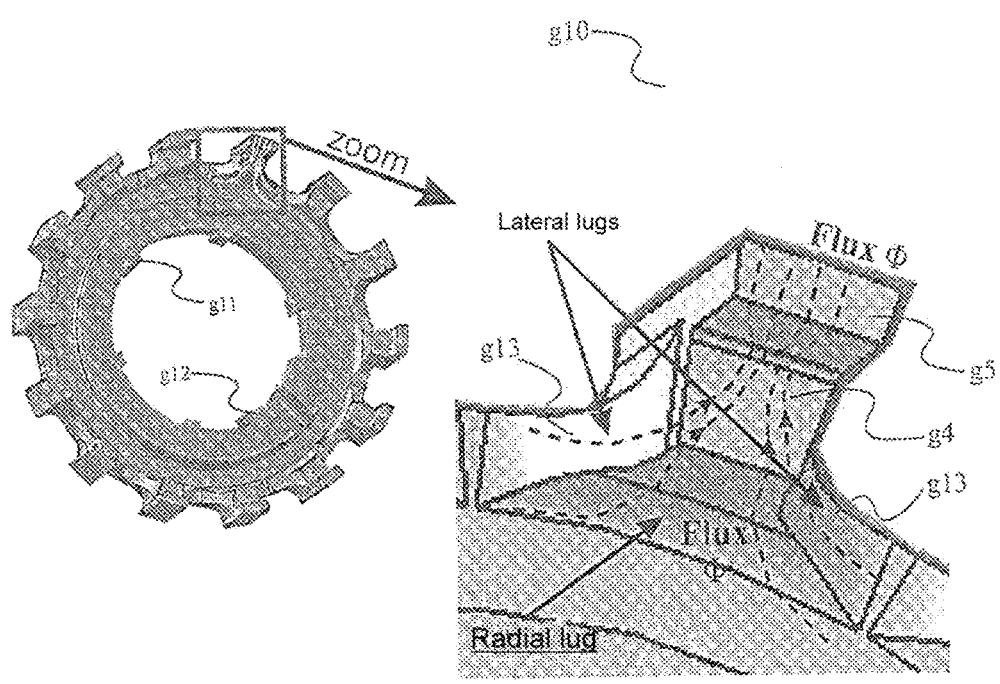
FIG. 15 shows perspective and isolated perspective views of a proposed alternative embodiment of a tooth according to the invention.

FIG. 15 shows an improved form (g10) of the shape (g2), this form including two lateral lugs (g13), formed in an axial direction (along the rotation direction), these lateral lugs (g13) allowing a three-dimensional flux concentration at the notch tip. The presence of a stair step (g4) on the tooth tip (g5) is optional, but it makes it possible to improve the torque supplied by the motor.

A homopolar mono-phase machine (also called transverse flux electric machine), such as (a14a) or (a14b), is made by combining two identical claws (g2) or (g10) opposite one another, said claws (g2) or (g10) gripping a coil (a15). Angular wedging lugs (g11) and/or (g12) can be arranged in the claws (g2) or (g10), in order to ensure adequate angular wedging thereof, substantially by half an electric revolution) (180°).

In one particular embodiment, the parts (g2) and (g10) may be asymmetrical in a discoid, polar cylinder, or axisymmetric plane.

Figure 16:
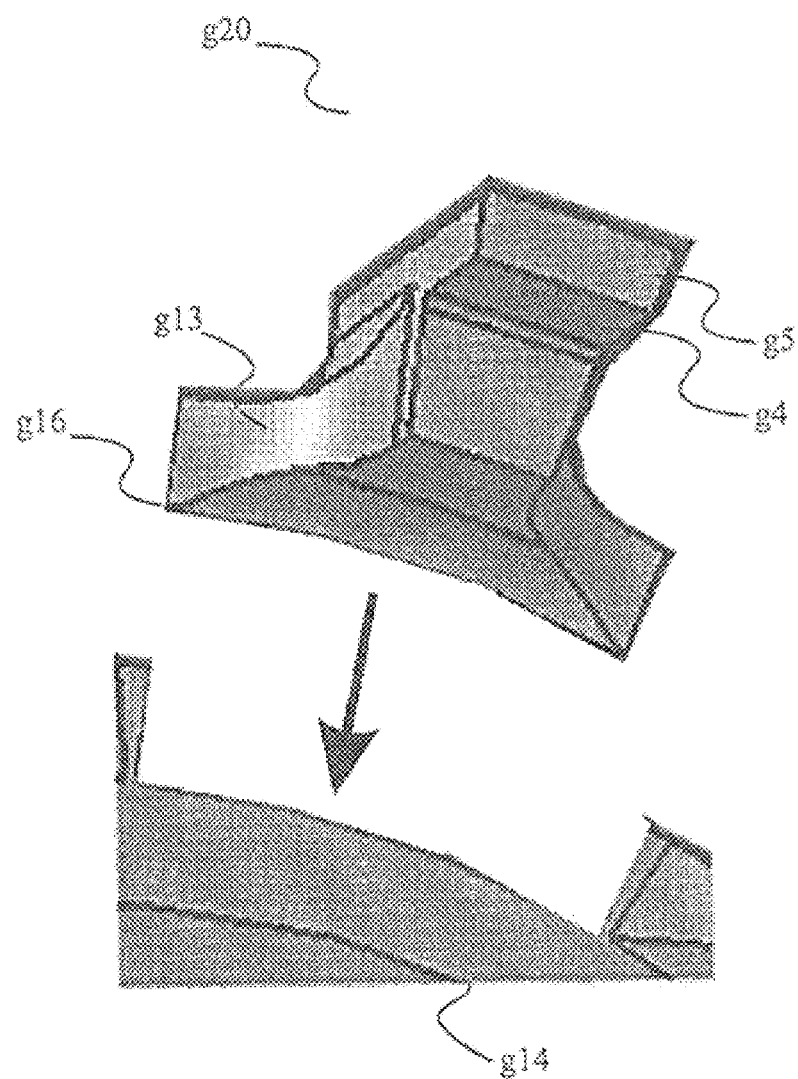
FIG. 16 shows an enlarged perspective view of another alternative embodiment of a tooth according to the invention.

In another particular embodiment (g20), as described in FIG. 16, the parts (g2) and (g10) of FIGS. 14 and 15 can be made up of several independent parts, for example the assembly (g16) joining the shapes (g4), (g5) and (g13) can be inserted in a primary part (g14) forming a cylinder head. A maintaining device is required to ensure the cohesion of the claw formed from the joining of the parts (g16) and (g14), said maintaining device being able to be a screwing, riveting, keying, or hot or cold forcible insertion system, the subsequent resin coating of the mono-phase machine thus produced ensuring that the assembly is kept in place, under the electromagnetic stress. In the case of this embodiment (g20), the part (g14) can be made from ferromagnetic sheet metal, the sheet metal being able to be stacked, in one clever embodiment among others, in successive discoid planes and the parts (g16) made from compressed iron powder.

Figure 4:
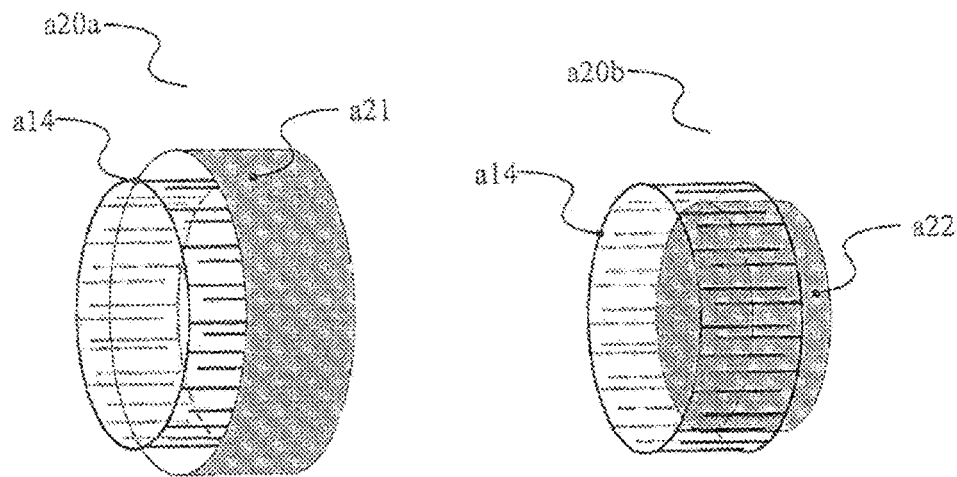
FIG. 4 includes schematic views of a coil and claws of the prior art.
Figure 5:
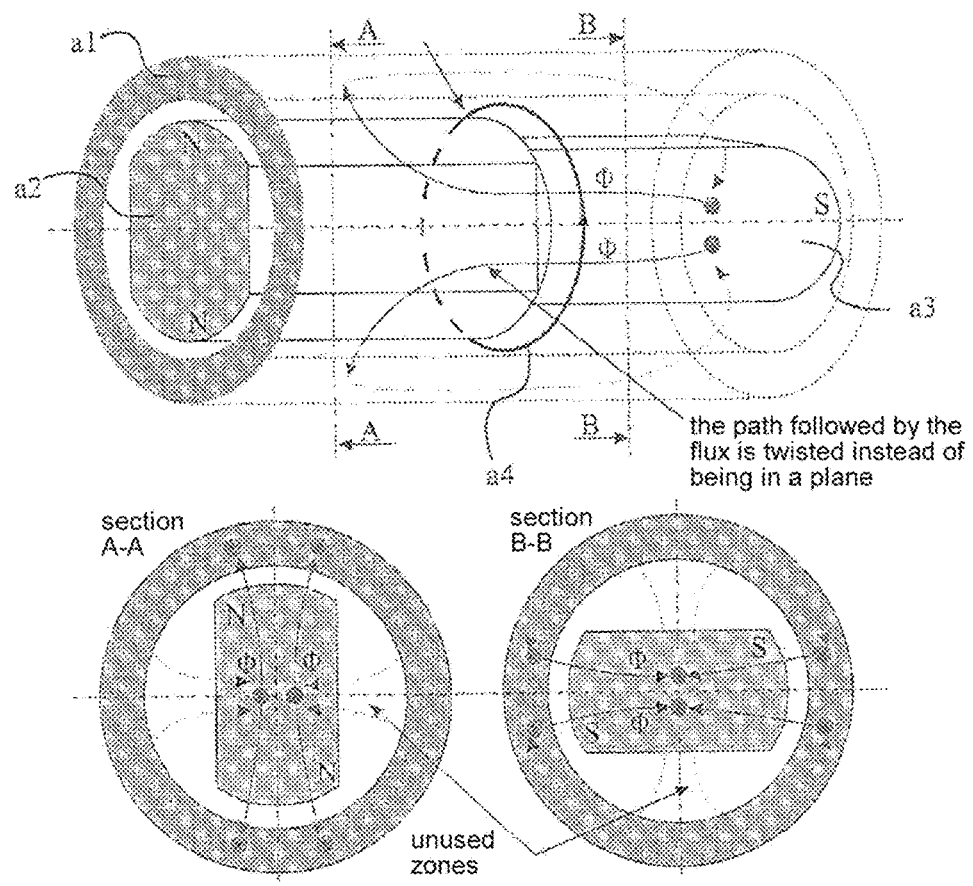
FIG. 5 includes schematic views of an electric rotary machine of the prior art.
Figure 6:
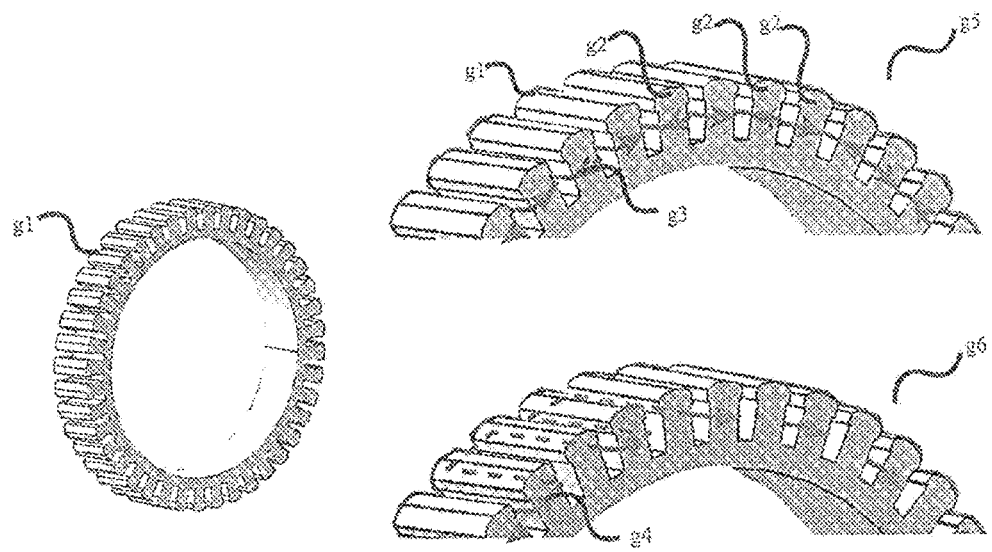
FIG. 6 includes perspective and enlarged perspective views of assemblies of a mono-phase machine of the prior art.
Figure 17:
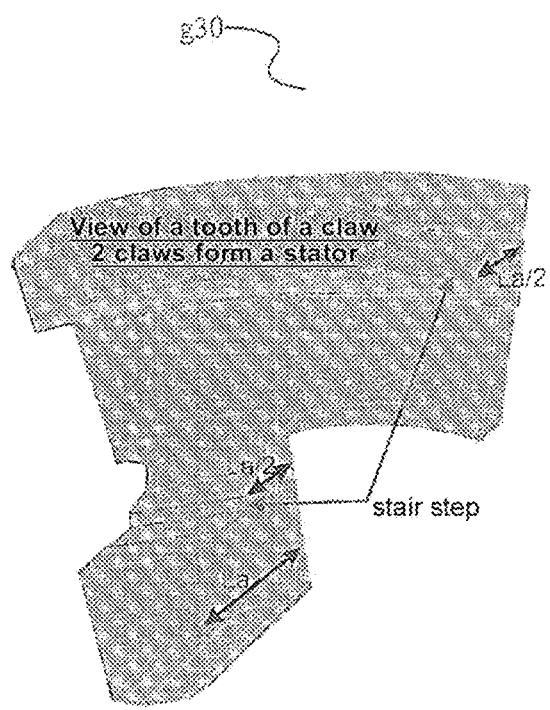
FIG. 17 shows a partial perspective view of a tooth and a fraction of a cylinder head of a stator according to the invention.

The inventions (g2), (g10) and (g20) are suitable for an inverse machine (a20a) (see FIG. 4). The transposition to a direct machine (a20b) is immediate, by turning the shapes over in a radial direction, around the cylinder formed by the air gap. FIG. 17 shows a partial embodiment (g30) adapted to a machine of the type (a20b) of the inventions (g2), (g10) and (g20).

The stair step (g4) can be made in a median discoid plane (relative to the cylinder containing the assembly) of the claw (g10), but it can also be made in a plane situated in another location.

The side face in a discoid plane of the stair step (g4) can follow a disc portion centered on the rotation axis of the motor, but it can also follow a frustoconical portion.

Figure 18:
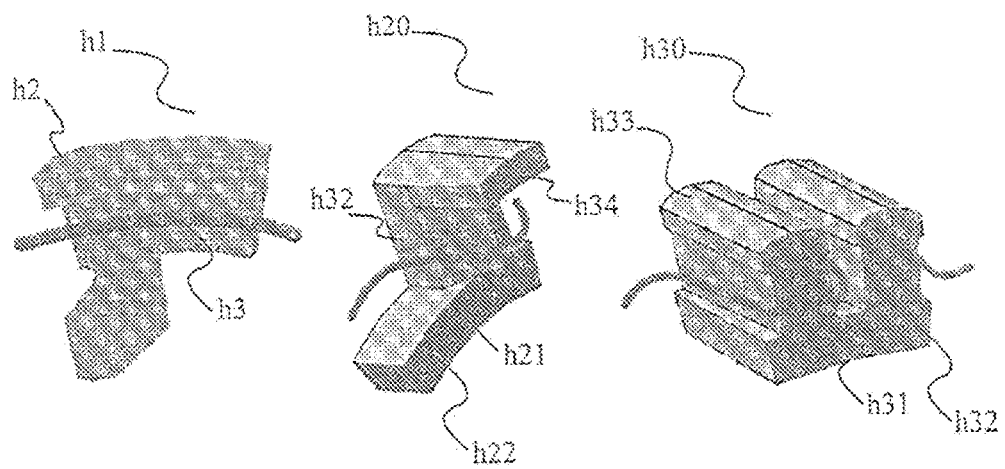
FIG. 18 shows perspective views of fractions of cylinder heads of a stator with different models of teeth cooperating with an inductive coil according to the invention.

FIG. 18 shows the implantation of improved teeth or poles according to the invention. The production of a homopolar machine part (a14) (also called transverse flux electric machine), according to the principle (a14a) or (a14b) of FIG. 3 in one or two parts, which may or may not be symmetrical, uses the inventive form (h1) of FIG. 18, obeying the characteristics previously described. Said form (h1) includes a part (h2), which receives an annular coil (h3).

Figure 7:
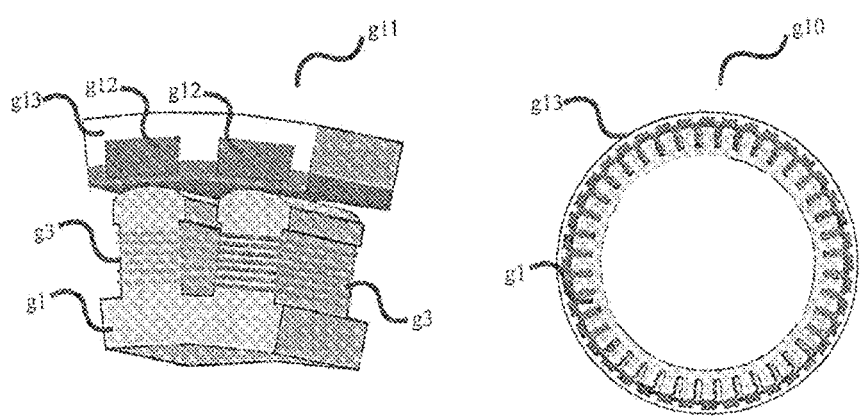
FIG. 7 includes end elevation and enlarged perspective views of assemblies of a mono-phase machine of the prior art.

If said coil (h3) is twisted in a form (f11) or (f12) or (f13) of FIG. 10, it is then possible to produce the form (h20), where the coil (h21) is wound around tooth feet (h23). Going further into this concept, the form (h30) appears, which corresponds to a traditional mono-phase machine as shown in FIG. 7, where the winding (h31) can be made in an interleaved (g3) or undulated (g4) manner. This invention makes it possible to increase the flux passing through the foot (h23) of the tooth, therefore the torque supplied by the machine.

Figure 19:
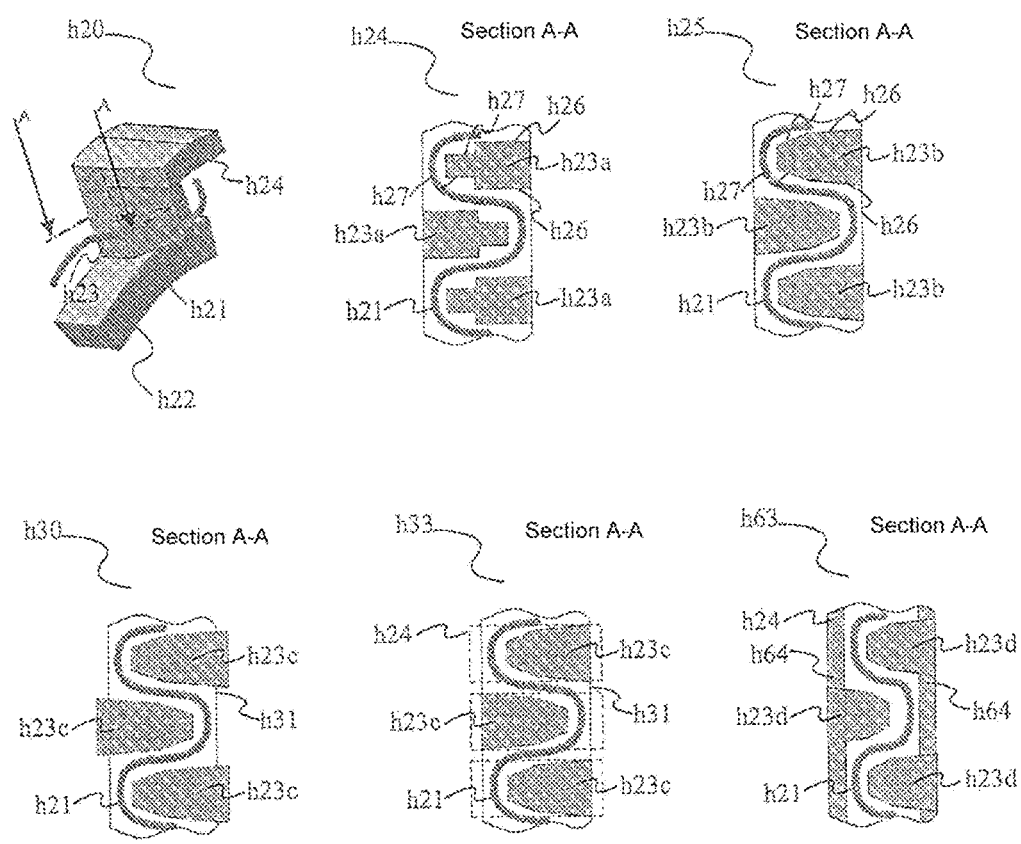
FIG. 19 show a perspective and schematic views illustrating several types of cross-sections of tooth feet or poles according to the invention.
Figure 20:
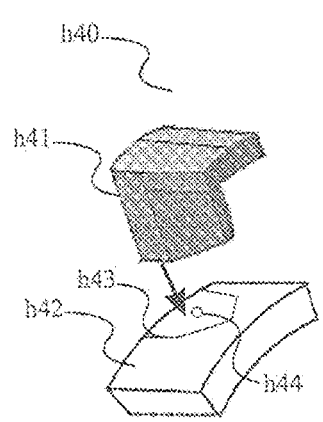
FIG. 20 shows a perspective view of an embodiment of a tooth separated from the cylinder head according to the invention.
Figure 21:
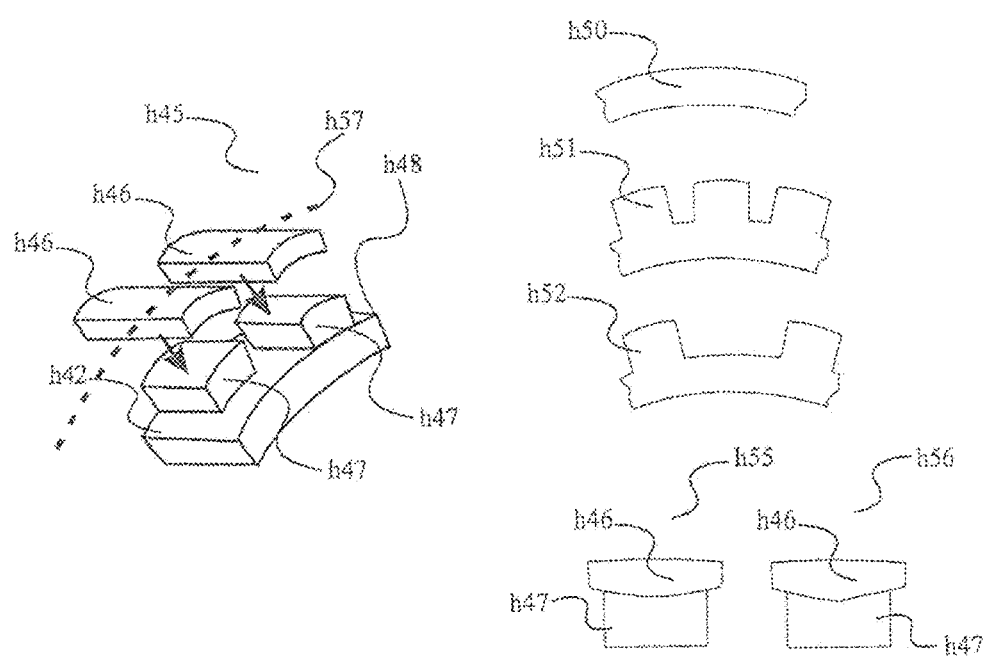
FIG. 21 shows schematic views of an embodiment of the toothed cylinder heads according to the invention.

FIG. 19 shows the possible forms of tooth legs (h23), describing, with the cutting planes A-A of the tooth leg (h23), two solutions (h24) and (h25) among others. In solution (h24), the tooth feet (h23a) have a section made up of notches, the exact shapes of which may adopt any one of the solutions in the following non-exhaustive list:

1. the faces (h26) are parallel to one another;
2. the faces (h27) are parallel to one another;
3. the faces (h26) are not parallel to one another and follow a frustoconical shape, preferably oriented toward the model (h25);
4. the faces (h27) are not parallel to one another and follow a frustoconical shape, preferably oriented toward the model (h25);
5. the faces (h26) follow a curved shape, made up of portions of ellipses, circles, or any other function;
6. the faces (h27) follow a curved shape, made up of portions of ellipses, circles, or any other function;
7. the notch foot (h23c) axially spills over the cylinder head (h22), which is illustrated by (h20); this spillover may or may not be symmetrical;
8. the cap (h24) axially spills over, in a manner that may or may not be symmetrical, as illustrated by (h33);
9. the cylinder head (h42) is separate from the notch foot (h41), as shown by FIG. 20, to form an assembly (h40), where the tooth leg (h41) is placed or nested on the cylinder head (h42); this solution is particularly advantageous, since it makes it possible to make the tooth feet using iron powder technologies by radial compression;
10. the tooth foot (h41) is inserted into the cylinder head (h42), either forcibly in a mark (h43), or by a tightening means, which may be a rivet, a screw or any other means, using a hole (h44), arranged in the cylinder head (h42) or in the tooth leg (h41);
11. the cylinder head (h42) is made from ferromagnetic sheet metal, this ferromagnetic sheet metal being, in one clever embodiment among others, stacked along the axial length of the machine (h40);
12. the cylinder head (h42) is made in one or two parts with an identical or different axial length;
13. the embodiment (h45) of FIG. 21 has a same part (h48) including the cylinder head (h42) and the tooth legs (h47). One possible embodiment consists of manufacturing this part (h48) with stacked foliated metal sheets, in one clever embodiment among others, along a discoid plane perpendicular to the rotation axis of the motor, these packets of metal sheets being split into two or three groups, or more, each corresponding to a toothing required by the shape demanded by (h48), using either optionally the sheet metal forms (h50) without notches for the middle or edges of (h48), or optionally for the middle of (h48), the sheet metal forms (h51) including two tooth legs (h47) per electric revolution) (360°), or optionally for the edges of (h48), the sheet metal forms (h52) including a single tooth leg (h47) per electric revolution (360°). In embodiment (h48), the caps (h46) are attached above the tooth legs (h47), these caps (h46) can be maintained by a screw, an eyelet, a key or any other tightening device, these caps (h46) can also be placed on the tooth legs (h47), which receive them in a triangular (h56) or elliptical (h55) form, then they are maintained by an external binding band (h57), in one particularly advantageous embodiment, the caps (h46) are made from compressed iron powder;
14. the embodiment (h63) of FIG. 20 shows parts (h64) that make the sides of the claws (h20) blind, these parts (h64) being able to form a single piece with (h23d);
15. if the parts (h20) are made in two half-parts, which may be identical or different, then their junction plane may be a smooth discoid ring, or even a ring undulated substantially in the axial direction, for example following the form of the tooth tips (h34);
16. the annular parts forming the claws are made in more than one piece, which are next assembled using assembly devices.

Figure 26:
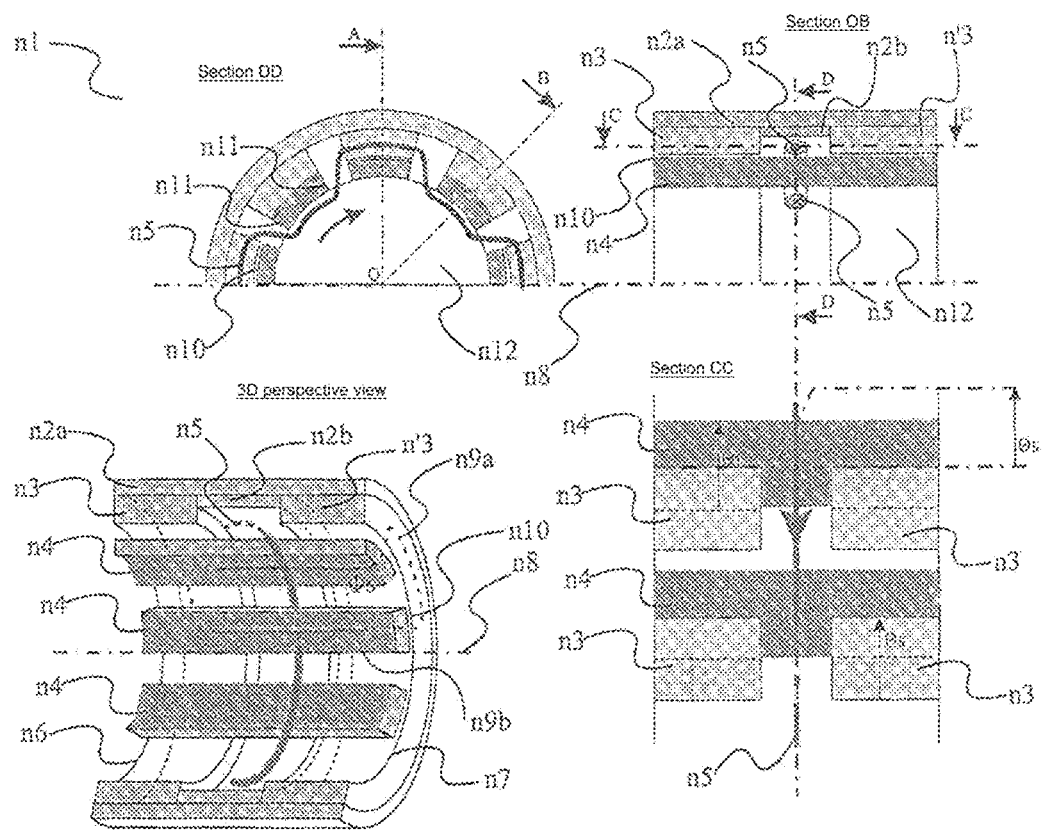
FIG. 26 shows sectional views of a homopolar motor structure with an inductive coil alternatively passing above and below inductor bars of an inductor according to the invention.

These improvements to the teeth or poles can be used in a homopolar motor (also called transverse flux electric motor) with a so-called composite structure (n1), as shown in FIG. 26. Said motor is made up of an axial stack of at least two armatures (n3) and (n'3), separated by at least one coil (n5) wound around the rotation axis (n8). The coil (n5) is not necessarily annular. The armatures (n3) and (n'3) can be made either with a claw structure (a14a) or (a14b), or with a protruding pole structure (g1), or with a smooth pole structure, having any number of electric phases. In one clever embodiment, the structures of the parts (n3) and (n'3) are identical, chosen from among the groups (a14a) or (a14b) of the figure, or (g1) of FIG. 7, or with smooth poles. In another embodiment, they can be different from one another.

The armatures (n3) and (n'3) are situated across from an inductor made up of a group of several bars (n4) with any shape, which are arranged along a cylinder substantially concentric to the rotation axis (n8). The armatures (n3) and (n'3) are separated from the inductor by an air gap (n10). The inductor is shared by all of the armatures (n3) and (n'3), it is passive, i.e., formed completely or partially from ferromagnetic material. The excitation of the inductor can be active in a first embodiment owing to the stationary coil (n5) winding substantially around the rotation axis (n8). The coil (n5) can be mobile in another embodiment. The excitation of the inductor can be passive in another embodiment, then being done with at least one magnet for example having an annular shape winding substantially around the rotation axis (n8), preferably stationary, but said magnet may also be mobile.

The coils of the armatures (n3) and (n'3) are traveled by alternating currents denoted I3 and I'3, which include a time offset denoted φI3.

The armatures (n3) and (n'3) include a same number of poles, denoted Np, identical to the number of inductor bars (n4) in a first embodiment, or different in another embodiment, in which the number of bars is divided by two. The coil (n5) radially traverses the angular separating surfaces (n11) between the different inductor bars (n4) a number of times equal to the number of poles Np of the armature. It therefore passes Np/2 times above the bars (n4) and Np/2 times below the bars (n4), the terms above/below being considered in a radial direction.

FIG. 26 shows the general structure of the composite homopolar machine (also called transverse flux electric machine) (n1) according to the invention, in an embodiment corresponding to a single mono-phase alternating machine or with two composite homopolar machine structural phases, with a direct structure of type (a20b) (see FIG. 4) with protruding poles (g1) (see FIG. 7). The following demonstrations can be transposed to an inverse machine of type (a20a) of FIG. 4, through symmetry of all of the parts around a cylindrical surface centered on the axis (n8) and situated at the middle of the air gap (n10). In embodiment (n1), preferably, the inductor is stationary and the armature is mobile, which is the case for a direct current machine with a mechanical manifold.

The operating principle of said machine (n1) comes from the winding of the coil (n5) around inductor bars (n4), alternatively below and below. In this way, the North and South magnetic poles are created in the air gap, generating anti-symmetric magnetic poles between the side faces (n6) and (n7) of the machine. The inductor behaves equivalently to a group of magnets placed inside the armature (n3)/(n'3). The magnetic flux, denoted $\phi s$, circulates substantially along an axial line inside a bar (n4), then traverses the air gap (n10), then circulates substantially along a polar line in the armature (n3), once again traverses the air gap (n10), returns in the opposite direction along an axial line inside the bar (n4) consecutive to the first, then again traverses the air gap, to be contained through a polar line in the opposite armature (n'3).

A flux return part connects the armatures (n3) and (n'3); it may assume either a linking form (n2b) between the coplanar faces considered in a discoid plane of the armatures (n3) and (n'3), or a linking form (n2a) between the peripheral faces considered in a discoid plane of the armatures (n3) and (n'3), or a combination of the two preceding forms. The flux return part(s) (n2a) and/or (n2b) can be asymmetrical or irregular in a first embodiment. In a second embodiment, the flux return part(s) (n2a) and/or (n2b) can be cylindrical. In a third embodiment, the flux return part(s) (n2a) and/or (n2b) may not be used, and be eliminated from the design of the machine (n1). Preferably, when the produced machine (n1) includes at least more than two structural phases, it is advantageous to use flux return parts (n2a) and/or (n2b).

The armatures (n3) and (n'3) are angularly offset by an angle denoted $\theta s$. Said angle $\theta s$ corresponds to the angle of symmetry between the maximum air gap flux point generated by the armatures (n3) and (n'3), each of which is considered to be powered by a same direct current. In general, the armatures (n3) and (n'3) generate an air gap flux that alternately enters and leaves the air gap, the angle $\theta s$ representing the angular offset between these flux figures.

Preferably, if the machine (n1) is a mono-phase machine, the angle $\theta s$ is substantially equal to zero or 180 electric degrees, and the time offset $\phi I3$ is equal to zero or 180°. Preferably, if the machine (n1) is a polyphase machine, with a number of electric phases equal to Npe, the angle $\theta s$ is substantially equal in electric notation to (180°/Npe) and the time angle $\phi I3$ is equal to (180°/Npe).

The (Nn) inductor bars (n4) forming the inductor are supported by a maintaining part (n12), with an annular or cylindrical shape, integrating the means for maintenance in rotation, this part n(12) being able to provide the connection to the rotation axis. In one clever embodiment, the part (n12) is ferromagnetic. In another embodiment, the part (n12) is not ferromagnetic; it may then be made from an electrically conductive or insulating material.

The angular lengths of the parts (n4) and protrusions of the parts (n3) and (n'3) (if said angular lengths exist, which is not the case with parts with a smooth pole) are preferably substantially equal to ⅓ of an electric revolution, or 120 electric degrees.

Figure 27:
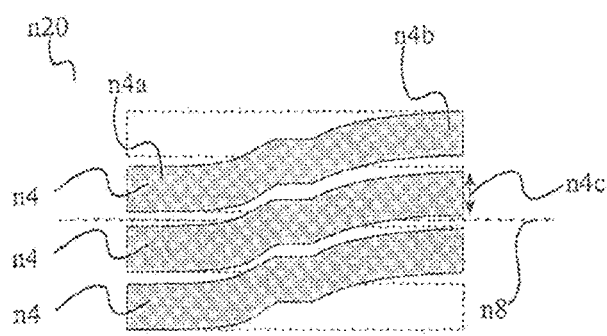
FIG. 27 shows a schematic view of an exemplary embodiment of inductor bars according to the invention.

FIG. 27 describes a clever embodiment (n20) of the inductor according to which the inductor bars (n4) are twisted such that each of their ends (n4a) and (n4b) is angularly offset.

The shape of the inductor bars (n4) seen in a cylindrical plane developed at the air gap does not necessarily need to be a rectangle; it may have any other shape, such as semi-annular, elliptical, semi-elliptical, rounded, circular, semicircular. One skilled in the art will know how to determine the best shape.

Figure 28:
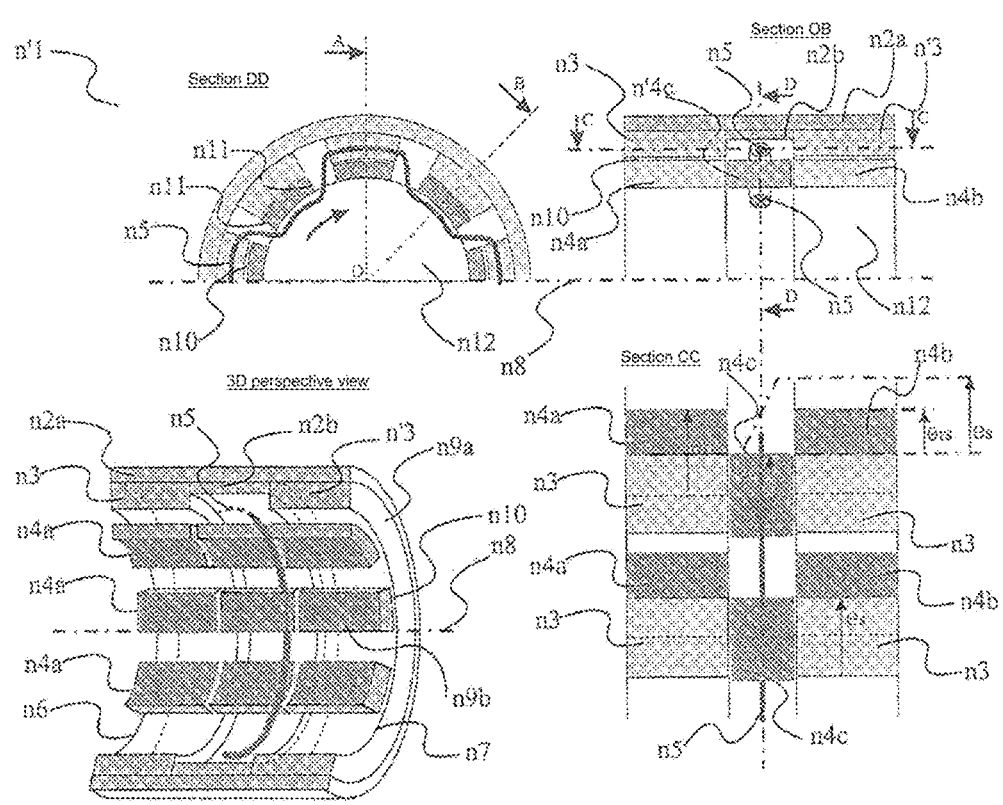
FIG. 28 shows sectional views of an alternative embodiment of the inductor bars of FIG. 26.

FIG. 28 shows a particular embodiment (n'1) of the composite homopolar machine (n1), transposed to the case where the armatures (n3) and (n'3) are stationary and the inductor is mobile, which corresponds to the cases of a synchronous machine. In this case, the inductor bars (n4) that form the inductor are each split into three parts: (n4a) and (n4b), which are mechanically secured to the part (n12) on the one hand, and on the other hand, (n4c), which are mechanically secured to the armatures (n3) and (n'3). In the case of FIG. 28, the rotor is considered as an example to be mechanically secured to the parts (n4a), (n4b) and (n12).

Preferably, the polar angle $\theta rs$ between each group of parts (n4a) and (n4b) on the one hand and (n4c) on the other hand is substantially equal to 90 electric degrees in the case of a mono-phase machine where $\theta s=0$, and in the case where the machine is a polyphase machine, $\theta rs=90/N pe$.

Figure 29:
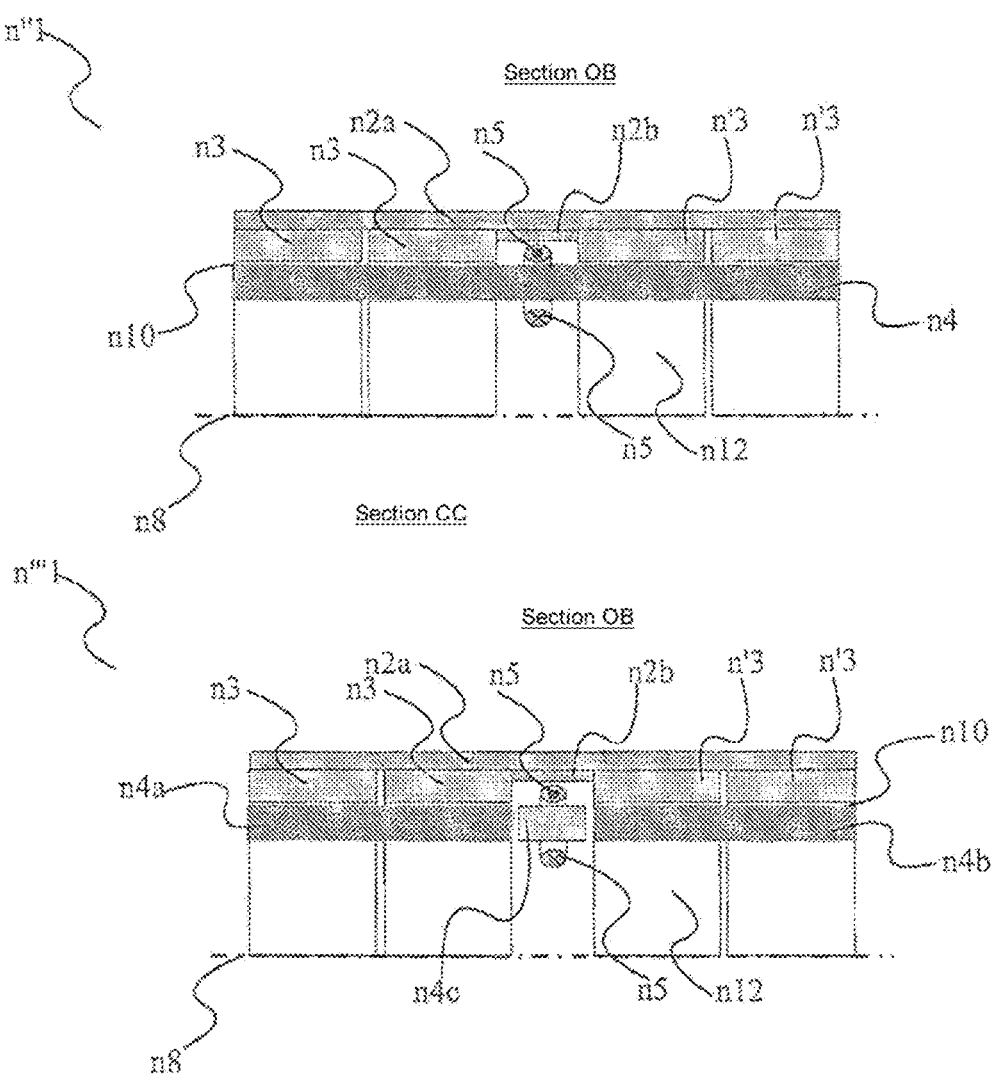
FIG. 29 shows sectional views of an alternative embodiment with several armatures placed on either side of an inductive coil according to the invention.
Figure 30:
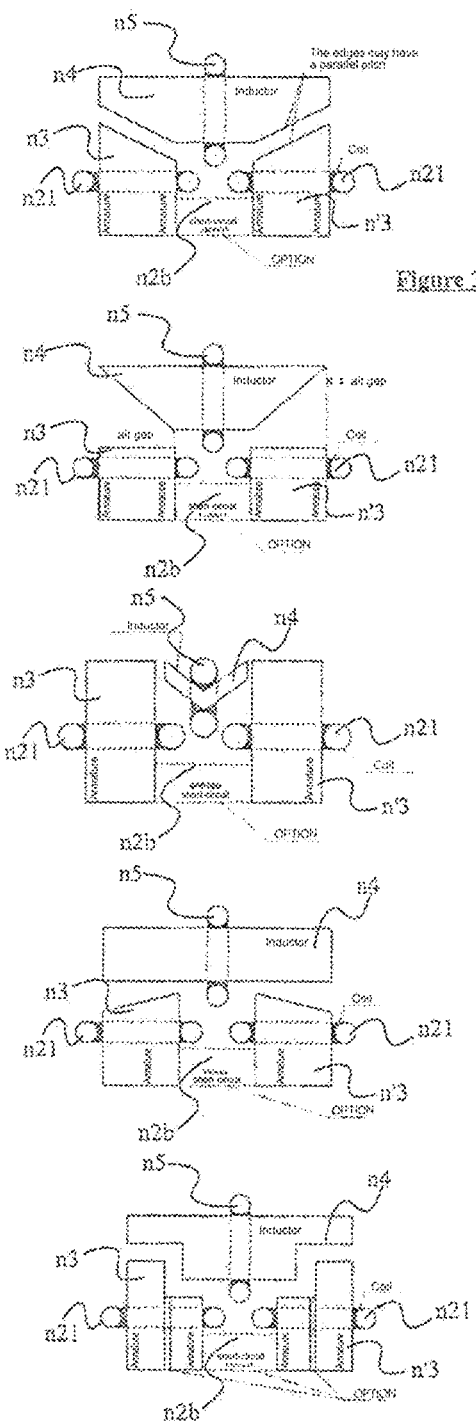
FIG. 30 shows several schematic views of possible configurations for a homopolar motor according to the invention.
Figure 30:
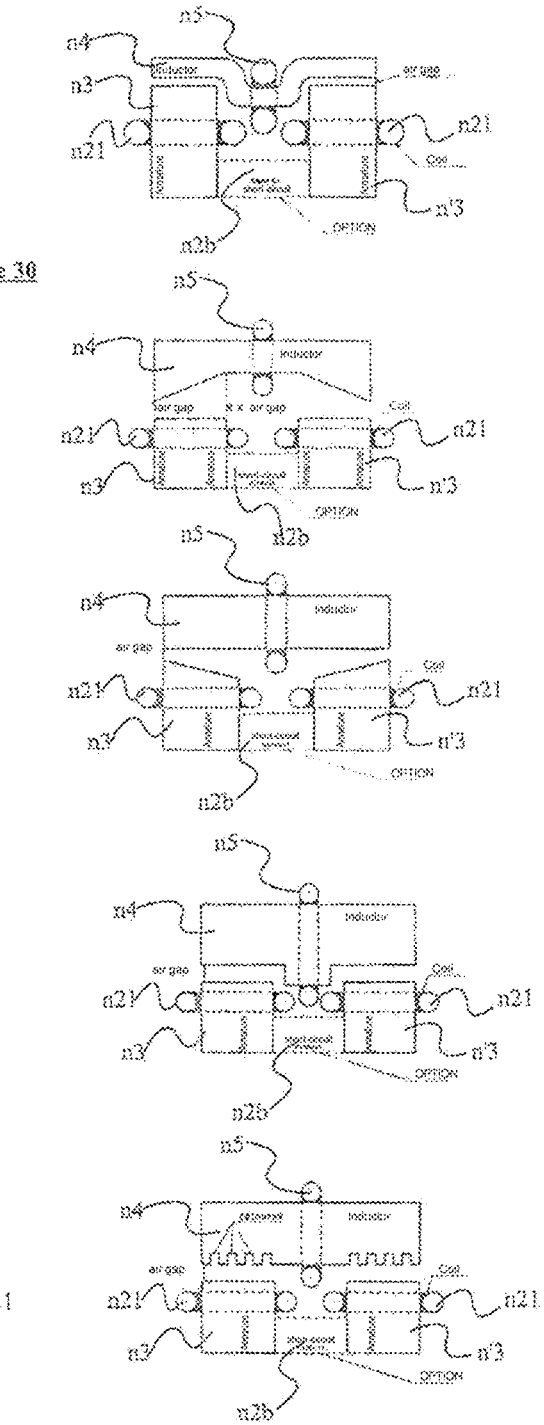

FIG. 29 shows the case where several armatures (n3) and (n'3) are aligned on either side of the central coil (n5). In the case (n"1) corresponding to the machine (n1), where the inductor bars (n4) are in a single piece, said bars (n4) are axially elongated so as to axially substantially cover the length of the machine. The other constructive arrangements established for the machine (n1) remain valid. In one particular advantageous arrangement, the armatures (n3) and (n'3) are each angularly shifted relative to one another by an electric angle equal to 180°/Npe.

In the case (n'''1) corresponding to the machine (n'1), where the inductor bars (n4) are split into three pieces, the bars (n4a) and (n4b) are axially elongated so as to axially substantially cover the length of the machine. The other constructive arrangements established for the machine (n'1) remain valid. In one particular advantageous arrangement, the armatures (n3) and (n'3) are angularly shifted by an electric angle equal to 180°/Npe.

It is possible to extend the concept described in FIG. 29 for the machines (n"1) and (n'''1) to machines including any number of parts (n3) and (n'3) greater than one, said numbers of parts (n3) and (n'3) being able to be asymmetrical.

In a first polyphase embodiment of the machine (n1) according to the invention, described in FIG. 26, the number of structural phases being greater than or equal to the unit, the machine according to the invention is made up of at least as many mono-phase machines (n1), or (n'1), or (n"1), or (n'"1) as external electric phases. In this polyphase arrangement, one particular embodiment corresponds to a configuration where all of these machines (n1) or (n'1) or (n"1) or (n'"1) are mono-phase and are aligned along the axis (n8) and regularly offset by an electric angle equal to substantially one complete revolution (360°), divided by the number of phases Npe.

In one particular embodiment, the rotor coil (n5) is eliminated and the flux return part (n2a) and/or (n2b) is replaced by at least one annular magnet, magnetized substantially along the direction of the axis (n8). Said annular magnet then takes the place of the flux return part (n2a) and/or (n2b). In another particular embodiment, with the same constructive arrangement, the annular magnet is gripped between one or two substantially trapezoidal or elliptical ferromagnetic parts, which make it possible to concentrate the flux coming from the annular magnet, said parts having a cone trunk shape, with the widest side against the magnet.

In one particular embodiment, the inductive coil (n5) can be supplied with alternating current, at a frequency and electric phase equal to or different from the supply frequency of the armature coils used in the parts (n3) and/or (n'3).

In one particular embodiment, the inductor coil (n5) can be eliminated, all of the proposed constructive arrangements remaining valid.

In one particular embodiment, the inductor coil (n5) can be electrically connected in series with one of the direct current inputs of the inverter powering the armature coils used in the parts (n3) and (n'3); said inverter can be electromechanical with a brush, or electronic.

In one particular embodiment, the external shape of the parts (n3) and/or (n'3) and flux return part (e1) is not inserted into a cylinder, but in another form that may the rectangular, elliptical or the like; one skilled in the art will then know how to adapt the production of the machine to this particular constructive arrangement.

FIGS. 30, 34, 35 and 36 show different possible alternative embodiments of the parts (n3), (n'3) provided with their armature coils (n21), (n4), (n5) and (n2b), applied to a machine of type (n1). Said alternative embodiments can be extrapolated directly to the other machines, of the inverse or direct types (n'1), (n"1) and (n'"1).

Figure 31:
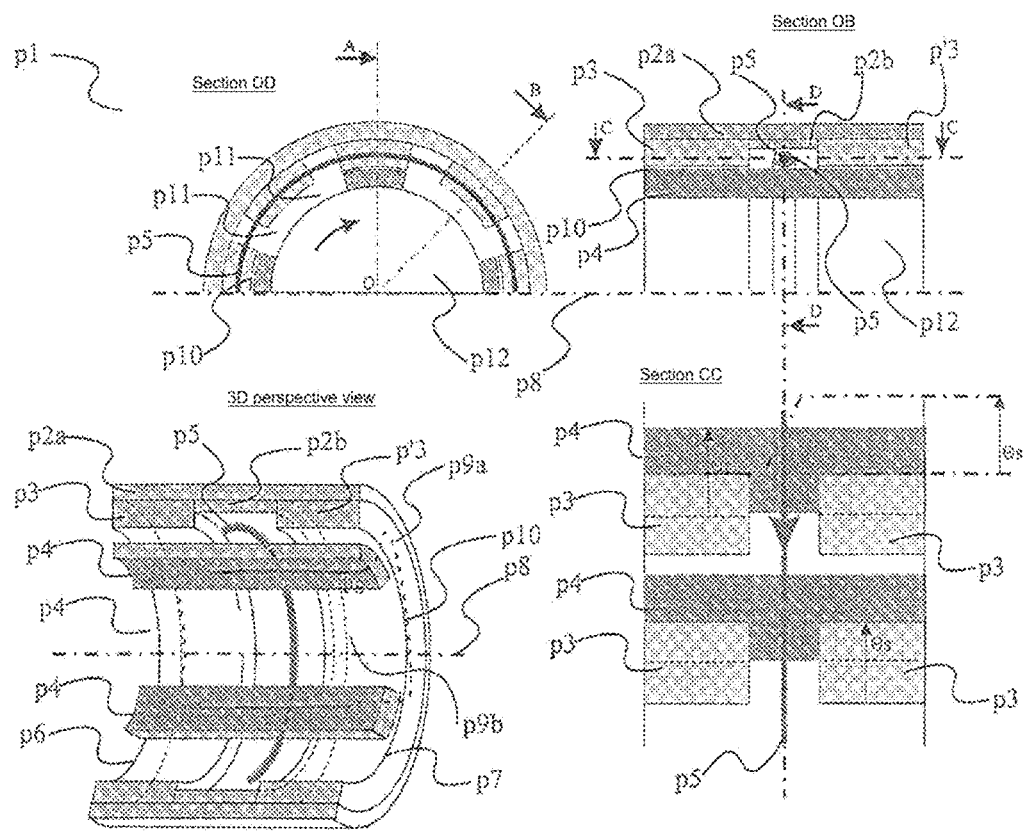
FIG. 31 shows sectional views of a homopolar motor with a dual structure according to the invention.

One alternative according to the present invention relates to a homopolar motor (also called transverse flux electric motor) with a so-called dual composite structure (p1), as shown in FIG. 31. Said motor is made up of an axial stack of at least two armatures (p3) and (p'3), separated by at least one coil (p5) wound around the rotation axis (p8). The coil (p5) is not necessarily annular. The armatures (p3) and (p'3) can be made either with a claw structure (a14a) or (a14b) of FIG. 3, or with a protruding pole structure (g1) of FIG. 7, or with a smooth pole structure, having any number of electric phases. In one clever embodiment, the structures of the parts (p3) and (p'3) are identical, chosen from among the groups (a14a) or (a14b) or (g1) or with smooth poles. In another embodiment, they can be different from one another.

The armatures (p3) and (p'3) are situated across from an inductor made up of a group of (Nn) bars (p4) with any shape, which are arranged along a cylinder substantially concentric to the rotation axis (p8). The armatures (p3) and (p'3) are separated from the inductor by an air gap (p10). The inductor is shared by all of the armatures (p3) and (p'3), it is passive, i.e., formed completely or partially from ferromagnetic material. The excitation of the inductor can be active in a first embodiment owing to the stationary coil (p5) winding substantially around the rotation axis (p8). The coil (p5) can be mobile in another embodiment. The excitation of the inductor can be passive in another embodiment, then being done with at least one magnet for example having an annular shape winding substantially around the rotation axis (p8), preferably stationary, but said magnet may also be mobile.

The coils of the armatures (p3) and (p'3) are traveled by alternating currents denoted I3 and I'3, which include a time offset denoted ϕI3.

The armatures (p3) and (p'3) include a same number of poles, denoted Np. The inductor includes an equal number of inductor bars (p4) in a first embodiment at Np/2. The coil (p5) is situated between the bars (p4) and the optional flux return parts (p2a) and/or (p2b). The coil (p5) is situated on the face of the bars (p4) that sees the air gap (p10).

FIG. 31 shows the general structure of the dual composite homopolar machine (p1) of the invention, in an embodiment corresponding to a single mono-phase alternating machine or with two dual composite homopolar machine structural phases, with a direct structure of type (a20b) (see FIG. 4) with protruding poles (g1) (see FIG. 7). The following demonstrations can be transposed to an inverse machine of type (a20a), through symmetry of all of the parts around a cylindrical surface centered on the axis (p8) and situated at the middle of the air gap (p10). In embodiment (p1), preferably, the inductor is stationary and the armature is mobile, which is the case for a direct current machine with a mechanical manifold.

The operating principle of said machine (p1) comes from the winding of the coil (p5) around the rotation axis (p8). In this way, equivalent magnetic poles are created, for example all North on side (p3) and all South on side (p'3). The inductor behaves equivalently to a group of magnets placed inside the armature (p3)/(p'3). The magnetic flux, denoted ϕs, circulates substantially along an axial line inside a bar (p4), then traverses the air gap (p10), then circulates substantially along a polar line in the armature (p3), once again traverses the air gap (p10), returns in the opposite direction along an axial line inside the bar (p4) consecutive to the first, then again traverses the air gap, to be contained through a polar line in the opposite armature (p'3).

A flux return part connects the armatures (p3) and (p'3); it may assume either a linking form (p2b) between the coplanar faces considered in a discoid plane of the armatures (p3) and (p'3), or a linking form (p2a) between the peripheral faces considered in a discoid plane of the armatures (p3) and (p'3), or a combination of the two preceding forms. The flux return part(s) (p2a) and/or (p2b) can be asymmetrical or irregular in a first embodiment. In a second embodiment, the flux return part(s) (p2a) and/or (p2b) can be cylindrical. In a third embodiment, the flux return part(s) (p2a) and/or (p2b) may not be used, and be eliminated from the design of the machine (p1). Preferably, when the produced machine (p1) includes at least more than two structural phases, it is advantageous to use flux return parts (p2a) and/or (p2b).

The armatures (p3) and (p'3) are angularly offset by an angle denoted θs. Said angle θs corresponds to the angle of symmetry between the maximum air gap flux point generated by the armatures (p3) and (p'3), each of which is considered to be powered by a same direct current. In general, the armatures (p3) and (p'3) generate an air gap flux that alternately enters and leaves the air gap, the angle θs representing the angular offset between these flux figures.

Preferably, if the machine (p1) is a mono-phase machine, the angle θs is substantially equal to zero or 180 electric degrees, and the time offset ϕI3 is equal to zero or 180°.

Preferably, if the machine (p1) is a polyphase machine, with a number of electric phases equal to Npe, the angle θs is substantially equal in electric notation to (180°/Npe) and the time angle φl3 is equal to (180°/Npe).

The inductor bars (p4) forming the inductor are supported by a maintaining part (p12), with an annular or cylindrical shape, integrating the means for maintenance in rotation, this part n(12) being able to provide the connection to the rotation axis. In one clever embodiment, the part (p12) is ferromagnetic. In another embodiment, the part (p12) is not ferromagnetic; it may then be made from an electrically conductive or insulating material.

The angular lengths of the parts (p4) and protrusions of the parts (p3) and (p'3) (if said angular lengths exist, which is not the case with parts with smooth poles) are preferably substantially equal to ⅓ of an electric revolution, or 120 electric degrees.

Figure 32:
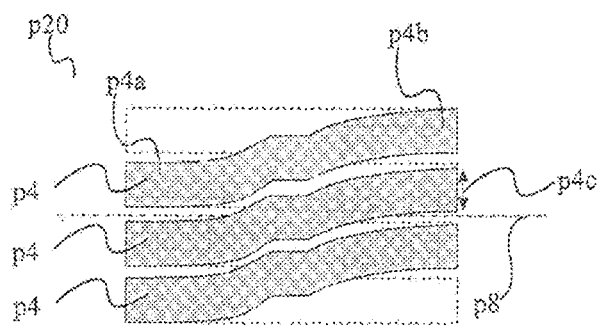
FIG. 32 shows a schematic view of an exemplary embodiment of inductor bars for the homopolar motor with a dual structure of FIG. 31.

FIG. 32 describes a clever embodiment (p20) of the inductor (p4'), in which the inductor bars (p4) are twisted such that each of their ends (p4a) and (p4b) is angularly offset.

The shape of the inductor bars (p4) seen in a cylindrical plane developed at the air gap does not necessarily need to be a rectangle; it may have any other shape, such as semi-annular, elliptical, semi-elliptical, rounded, circular, semicircular. One skilled in the art will know how to determine the best shape.

Figure 33:
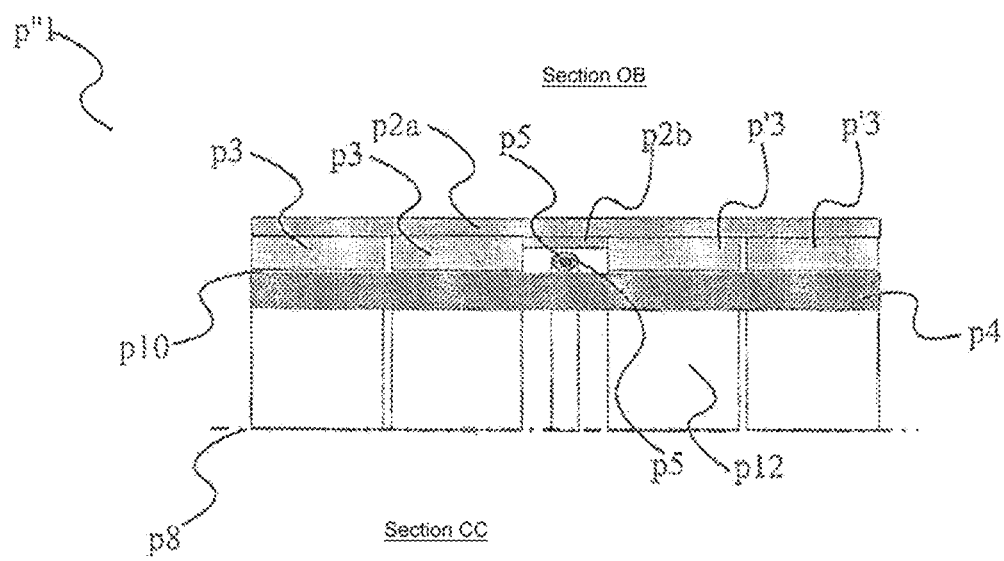
FIG. 33 shows a sectional view of an alternative embodiment with several armatures placed on either side of an inductive coil according to the invention for the dual structure homopolar motor of FIG. 31.
Figure 34:
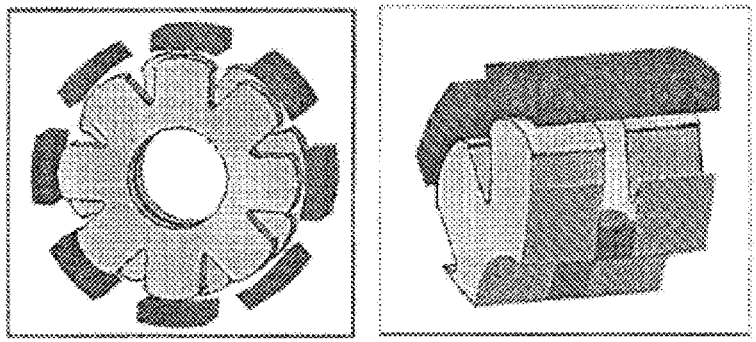
FIGS. 34 to 36 show perspective views of different alternative embodiments of homopolar motor parts according to the invention.
Figure 34:
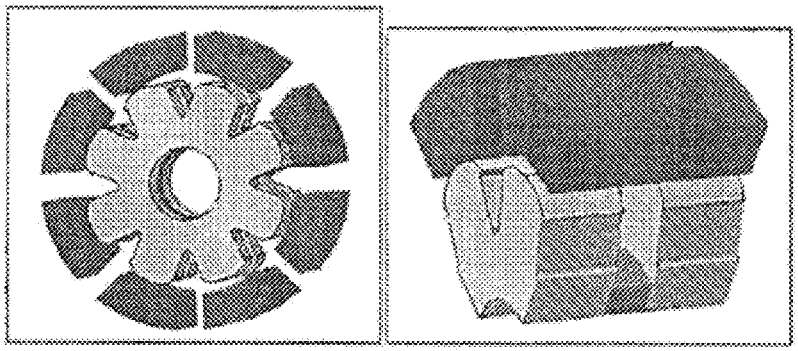
Figure 34:
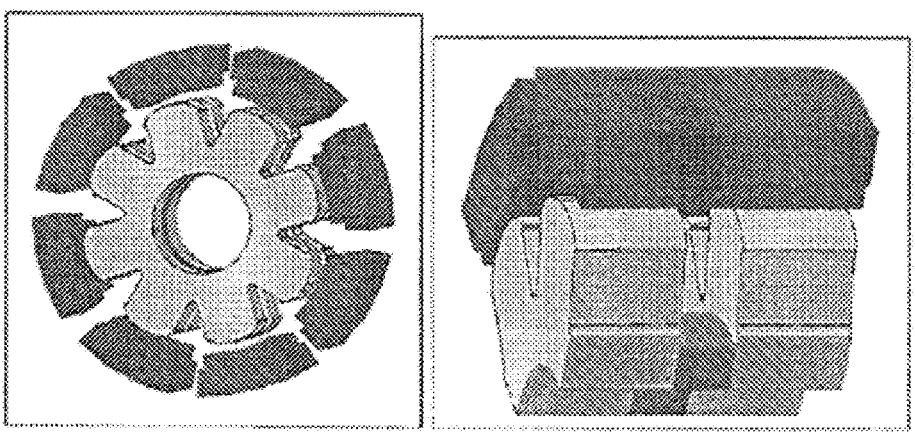
Figure 35:
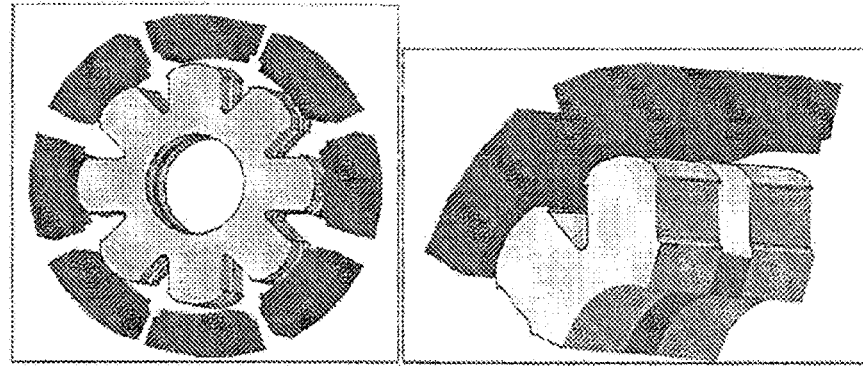
Figure 35:
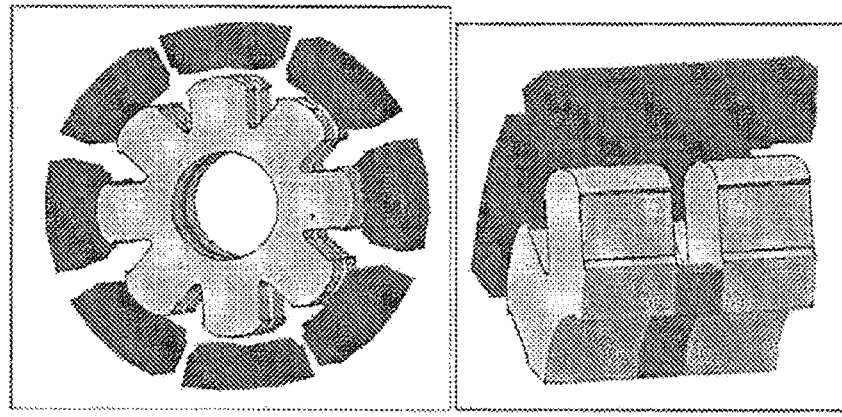
Figure 35:
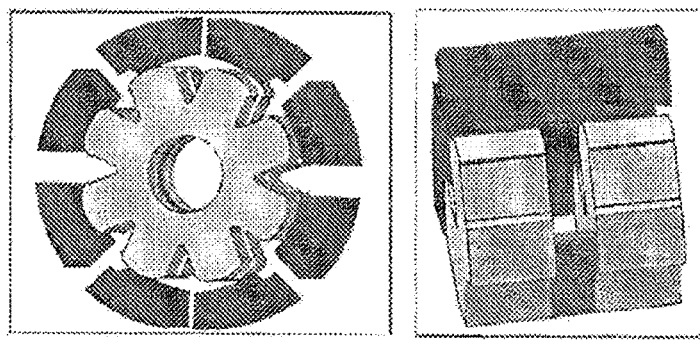
Figure 36:
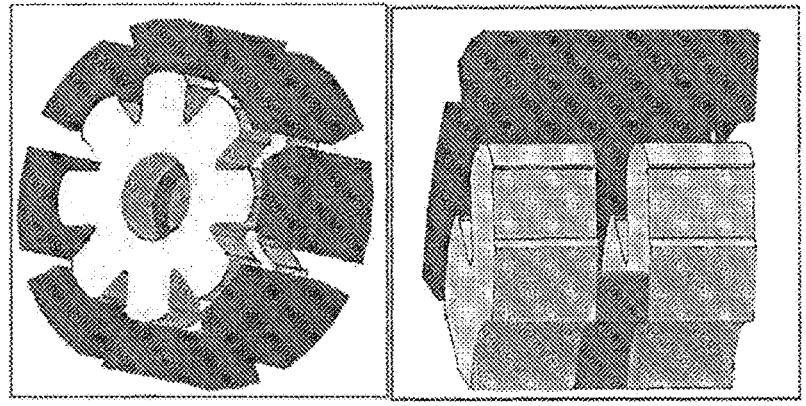
Figure 36:
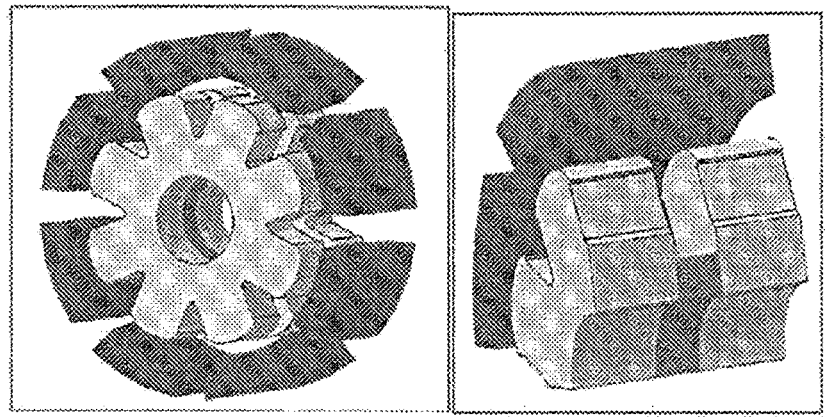
Figure 36:
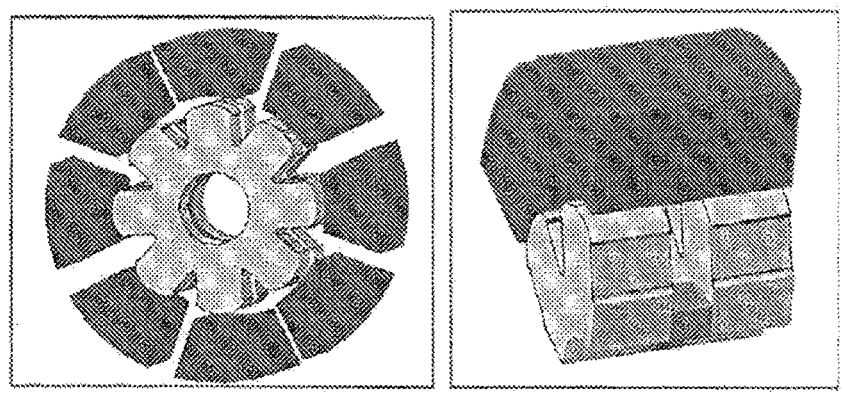

FIG. 33 shows the case where several armatures (p3) and (p'3) are aligned on either side of the central coil (p5). In the case (p"1) corresponding to the machine (p1), where the inductor bars (p4) are in a single piece, said bars (p4) are axially elongated so as to axially substantially cover the length of the machine. The other constructive arrangements established for the machine (p'1) remain valid. In one particular advantageous arrangement, the armatures (p3) and (p'3) are each angularly shifted relative to one another by an electric angle equal to 180°/Npe.

In the case (p'"1) corresponding to the machine (p'1), where the inductor bars (p4) are split into three pieces, the bars (p4a) and (p4b) are axially elongated so as to axially substantially cover the length of the machine. The other constructive arrangements established for the machine (p'1) remain valid. In one particular advantageous arrangement, the armatures (p3) and (p'3) are angularly shifted by an electric angle equal to 180°/Npe.

It is possible to extend the concept described in FIG. 33 for the machines (p"1) and (p'"1) to machines including any number of parts (p3) and (p'3) greater than one, said numbers of parts (p3) and (p'3) being able to be asymmetrical.

In a first polyphase embodiment of the machine (p1) according to the invention, described in FIG. 31, the number of structural phases being greater than or equal to the unit, the machine according to the invention is made up of at least as many mono-phase machines (p1), or (p'1), or (p"1), or (p'"1) as external electric phases. In this polyphase arrangement, one particular embodiment corresponds to a configuration where all of these machines (p1) or (p'1) or (p"1) or (p'"1) are mono-phase and are aligned along the axis (p8) and regularly offset by an electric angle equal to substantially one complete revolution (360°), divided by the number of phases Npe.

In one particular embodiment, the rotor coil (p5) is eliminated and the flux return part (p2a) and/or (p2b) is replaced by at least one annular magnet, magnetized substantially along the direction of the axis (p8). Said annular magnet then takes the place of the flux return part (p2a) and/or (p2b). In another particular embodiment, with the same constructive arrangement, the annular magnet is gripped between one or two substantially trapezoidal or elliptical ferromagnetic parts, which make it possible to concentrate the flux coming from the annular magnet, said parts having a cone trunk shape, with the widest side against the magnet.

In one particular embodiment, the inductive coil (p5) can be supplied with alternating current, at a frequency and electric phase equal to or different from the supply frequency of the armature coils used in the parts (p3) and/or (p'3).

In one particular embodiment, the inductor coil (p5) can be eliminated, all of the proposed constructive arrangements remaining valid.

In one particular embodiment, the inductor coil (p5) can be electrically connected in series with one of the direct current inputs of the inverter powering the armature coils used in the parts (p3) and (p'3); said inverter can be electromechanical with a brush, or electronic.

In one particular embodiment, the external shape of the parts (p3) and/or (p'3) and flux return part (p2a) is not inserted into a cylinder, but in another form that may the rectangular, elliptical or the like; one skilled in the art will then know how to adapt the production of the machine to this particular constructive arrangement.

The present invention is not limited to the example embodiments described and provided solely as an example. It extends to any modification, alternative form and variant form and structure within the scope of the claims that one skilled in the art may consider in the context of the present invention, and in particular all combinations of the various operating modes described above, which may be considered separately or in combination.

We claim:

1. A rotary electric machine with a homopolar structure having a number Npe of electric phases, the machine comprising:
    a juxtaposition, along the rotation axis of the rotary electric machine, of at least one pair of armatures having a number Np of poles, placed on either side of at least one inductive coil, wound around the rotation axis of the rotary electric machine, the adjacent armatures being angularly offset by any electric angle θs, preferably comprised between 0° and 90°/2Np; and
    at least one passive inductor comprised of a ferromagnetic material, separated from the armatures by an air gap,
    wherein one of the armatures and the inductor being rotatable and making up at least one rotor and the other of the armatures and the inductor being stationary and making up at least one stator.

2. The rotary electric machine, according to claim 1, wherein the inductor comprises Np inductor bars oriented in an axial direction, substantially covering the axial length of the machine and attached to a support connecting them.

3. The rotary electric machine, according to claim 1, wherein the inductive coil radially traverses the air gap all the way through each bar of the inductor, entering on one side and leaving from the other side so as to respectively pass above and below two adjacent parts of the inductor, in a radial direction.

4. The rotary electric machine, according to claim 1, wherein the inductive coil is situated completely between the armatures of the pair of armatures, and does not cross the air gap.

5. The rotary electric machine, according to claim 2, wherein the inductor bars are twisted, their axial ends being angularly offset.

6. The rotary electric machine, according to claim 2, wherein the inductor bars are split into several portions respectively positioned across from the armatures and the zone including the inductive coil(s), the portion(s) opposite the zone including the inductive coil(s) being secured to the armatures.

7. The rotary electric machine, according to claim 6, wherein the portions of the inductor bars secured to the armature are angularly offset relative to said armature by any value, with a preferential value of 90°/2Np, taken between the center of an armature pole and the center of the inductor bar secured to said armature.

8. The rotary electric machine, according to claim 7, wherein the support for the inductor bars is made from a ferromagnetic material.

9. The rotary electric machine, according to claim 1, wherein each armature of the pairs of armatures is comprised of a magnetic cylinder head connecting their poles, said armatures being connected to flux return polar parts connecting radial walls of the opposite armatures.

10. The rotary electric machine, according to claim 1, wherein each armature of the pairs of armatures is comprised of a magnetic cylinder head connecting their poles, the cylinder heads being connected by flux return polar parts surrounding the non-radial walls of the distal armatures of the inductor.

11. The rotary electric machine, according to claim 9, wherein the cylinder heads and the flux return polar parts are cylindrical.

12. The rotary electric machine, according to claim 1, wherein the armatures of the pairs of armatures separated by a coil are each comprised of several elementary armatures.

13. The rotary electric machine, according to claim 1, wherein the inductor comprises Np/2 inductor bars oriented in an axial direction, substantially covering the axial length of the machine and attached to a support connecting them to the rotation axis of the rotary electric machine, and the inductive coil is situated completely between the armatures of the pair of armatures, and does not cross the air gap.

14. The rotary electric machine, according to claim 1, wherein the inductive coil is replaced by a substantially annular magnet magnetized in the direction of the rotation axis of the rotary electric machine.

15. The rotary electric machine, according to claim 14, wherein the magnet is arranged in contact with at least one flux concentrating ferromagnetic polar part.

16. The rotary electric machine, according to claim 1, wherein the inductive coil is twisted, annular or undulated in a transverse plane.

17. The rotary electric machine, according to claim 1, wherein the inductive coils of the different phases are coupled in a star, triangle or zigzag.

18. The rotary electric machine, according to claim 1, further comprising: at least one stator or group of a plurality of stators associated with at least one rotor or group of a plurality of rotors.

19. The rotary electric machine, according to claim 1, wherein one armature is shared by several inductors or one inductor is shared by several armatures.

20. The rotary electric machine, according to claim 1, further comprising: a coupling part comprised of a ferromagnetic material connecting several inductors or the several armatures.

21. The rotary electric machine, according to claim 1, wherein the rotor comprises permanent magnets on a wall situated across from the stator(s).

22. The rotary electric machine, according to claim 21, wherein the magnets are inclined relative to a plane tangential to said wall situated across from the stator(s).

23. The rotary electric machine, according to claim 1, wherein free surfaces of the poles bordering the air gap are inclined in an axial directly, linearly or curved, or are asymmetrical in a transverse direction relative to a median axial plane of the pole containing the rotation axis of the rotary electric machine.

24. The rotary electric machine, according to claim 1, wherein poles of the armatures are made up of teeth including a radial leg connected via a foot to the cylinder head and an axial tip, said teeth of each armature being separated by an angular distance allowing the head-to-tail nesting of another armature with an identical toothed structure in order to form the pair of armatures around an inductive coil, characterized in that the tip includes at least one stair step-shaped indentation.

25. The rotary electric machine, according to claim 24, wherein the indentation is situated at a radial distance from the rotation axis of the rotary electric machine substantially equal to the radial distance from the wall of the cylinder head extending in an axial direction from which the teeth protrude.

26. The rotary electric machine, according to claim 25, wherein the indentation includes a wall situated in a median transverse plane of the pair of armatures.

27. The rotary electric machine, according to claim 24, wherein the teeth flare toward the lateral lugs at their connection to the cylinder head.

28. The rotary electric machine, according to claim 24, wherein the teeth are separate from the cylinder head.

29. The rotary electric machine, according to claim 28, wherein the cylinder head has recesses for fastening the teeth.

30. The rotary electric machine, according to claim 24, wherein the inductive coil is wound in a twisted manner around the feet of the teeth of the armatures of the pair of armatures surrounding the inductive coil.

31. The rotary electric machine, according to claim 24, wherein sections of the legs of the teeth have, in at least one cylindrical surface coaxial to the rotation axis, side walls parallel to one another, in a single piece or stair stepping.

32. The rotary electric machine, according to claim 24, wherein sections of the legs of the teeth have, in at least one plane with a section perpendicular to the radial dimension of the legs, inclined side walls, in particular in a single piece or stair stepping, or curved side walls.

33. The rotary electric machine, according to claim 24, wherein tips of the teeth are separate and attached on the legs.

34. A polyphase rotary electric machine, comprising:
a coaxial juxtaposition of rotary electric machines according to claim 1, regularly offset by an electric angle of 360°/2Np.

35. A polyphase rotary electric machine, comprising:
a coaxial juxtaposition of rotary electric machines according to claim 1, angularly aligned, an inter-phase phase shift being caused by the rotation, at the rotor, of the magnets or coiled inductors or polar protrusions.

36. The polyphase rotary electric machine according to claim 35, wherein intermediate coils are arranged between the mono-phase machines.

* * * * *